(12) United States Patent
Fairchild

(10) Patent No.: US 9,359,062 B2
(45) Date of Patent: ***Jun. 7, 2016

(54) AIRCRAFT ELEVATOR SYSTEM AND METHOD

(71) Applicant: Greenpoint Technologies, Inc., Kirkland, WA (US)

(72) Inventor: Sean J. Fairchild, Edmonds, WA (US)

(73) Assignee: Greenpoint Technologies, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,286

(22) Filed: Nov. 8, 2013

(65) Prior Publication Data

US 2016/0009362 A1 Jan. 14, 2016

Related U.S. Application Data

(63) Continuation of application No. 12/903,092, filed on Oct. 12, 2010, now Pat. No. 8,602,169.

(60) Provisional application No. 61/252,999, filed on Oct. 19, 2009, provisional application No. 61/251,257, filed on Oct. 13, 2009.

(51) Int. Cl.
*B64C 1/22* (2006.01)
*B64D 9/00* (2006.01)
*B64D 11/00* (2006.01)
*B66B 9/00* (2006.01)
(Continued)

(52) U.S. Cl.
CPC ... *B64C 1/22* (2013.01); *B64D 9/00* (2013.01); *B64D 11/0007* (2013.01); *B66B 9/00* (2013.01); *B66B 9/025* (2013.01); *B64C 2001/0027* (2013.01); *Y02T 50/46* (2013.01)

(58) Field of Classification Search
CPC .............................. B64D 11/0007; B64D 9/00
See application file for complete search history.

(56) References Cited

U.S. PATENT DOCUMENTS 2,086,002 A 7/1937 Shepard
3,046,908 A 7/1962 Der Yuen
(Continued)

FOREIGN PATENT DOCUMENTS

DE 19752390 A1 6/1999
DE 19955801 A1 6/2000
(Continued)

*Primary Examiner* — William E Dondero
*Assistant Examiner* — Diem Tran
(74) *Attorney, Agent, or Firm* — Seed IP Law Group PLLC

(57) ABSTRACT

An aircraft elevator system includes a fixed frame, a floating frame coupled to the fixed frame, and a cabin coupled to the floating frame. The floating frame can move with respect to the fixed frame and the cabin can move with respect to the floating frame. The system can include an actuating system operating at least one pulley system to move the cabin between upper and lower positions, which respectively can be inside and outside the aircraft. In some embodiments, the system includes a support assembly that moderates or eliminates load transfer between the system and an aircraft upper deck floor structure. In some embodiments, the cabin includes a ramp configured to deploy when approaching the lower position and to retract to a stowed position when the cabin moves from the lower position toward the upper position. The ramp can include a sensor to control cabin movement.

8 Claims, 24 Drawing Sheets

(51) Int. Cl.
    *B66B 9/02*     (2006.01)
    *B64C 1/00*     (2006.01)

(56) References Cited

U.S. PATENT DOCUMENTS

| | | | |
|---|---|---|---|
| 3,102,607 | A | 9/1963 | Roberts |
| 3,693,761 | A | 9/1972 | Fitzgibbon |
| 3,861,542 | A * | 1/1975 | Molter et al. ............... 244/137.1 |
| 4,653,707 | A * | 3/1987 | Hamilton et al. ........... 244/137.2 |
| 5,163,726 | A | 11/1992 | Boos et al. |
| 5,558,181 | A | 9/1996 | Bundo |
| 6,102,163 | A | 8/2000 | Liebetrau et al. |
| 6,776,263 | B2 | 8/2004 | Gottlieb et al. |
| 7,159,821 | B2 | 1/2007 | Harrington et al. |
| 7,178,637 | B2 | 2/2007 | Asano et al. |
| 7,318,566 | B2 * | 1/2008 | Hubenthal et al. ......... 244/137.2 |
| 7,484,596 | B2 | 2/2009 | Aulanko et al. |
| 7,584,926 | B2 * | 9/2009 | Harrington et al. ......... 244/118.5 |
| 8,757,327 | B2 * | 6/2014 | Ehlert et al. .................. 187/250 |
| 2003/0057031 | A1 * | 3/2003 | Gottlieb et al. ............... 187/394 |
| 2005/0211832 | A1 | 9/2005 | Baatz |
| 2006/0186268 | A1 | 8/2006 | Harrington et al. |
| 2009/0229923 | A1 | 9/2009 | Aulanko et al. |
| 2012/0261511 | A1 | 10/2012 | Ehlert et al. |

FOREIGN PATENT DOCUMENTS

| | | | |
|---|---|---|---|
| DE | 19900256 A1 | 7/2000 | |
| DE | 19956403 A1 * | 6/2001 | ............ B64D 11/04 |
| DE | 10158232 C1 | 4/2003 | |
| DE | 10204892 A1 * | 8/2003 | ............ B64D 11/04 |
| EP | 1792868 A1 | 6/2007 | |
| EP | 1947048 A1 | 7/2008 | |
| WO | 00/30422 A2 | 6/2000 | |
| WO | WO 0030422 A2 * | 6/2000 | |
| WO | 2004/069656 A1 | 8/2004 | |

* cited by examiner

AIRCRAFT ELEVATOR SYSTEM AND METHOD

BACKGROUND

1. Field

The present disclosure generally relates to elevator systems, and more particularly, to an elevator system configured to be used with transportation vessels, such as aircraft.

2. Description of the Related Art

Transportation vessels, particularly aircraft, continue to grow in size, capacity, and operation frequency. Various design and operation parameters contribute to the operation of these vessels. While all parameters share particular requirements, such as safety, some parameters have conflicting requirements. For example, with respect to the aircraft industry, reducing aircraft weight and efficient loading and unloading can have conflicting requirements.

Loading and unloading equipment and devices is typically accomplished using ground equipment that is not integrated with and is external to the aircraft to reduce aircraft weight. However, these systems can hinder turn-around time and/or increase risk of damage to aircraft, making loading and unloading inefficient.

Furthermore, aircraft without integrated lift systems are limited to being loaded and/or unloaded in only certain locations such as adjacent airport terminals that have external loading and unloading devices.

Some designs have emerged in an attempt to improve loading speed and flexibility. Some designs suggest provisions to allow the carriage of an integrated elevator system to exit the aircraft. Existing designs propose certain structural support installations and motion systems that purportedly achieve this goal; however, generally there has not been a practical integrated lift system marketed for installation in aircraft, in particular, multi-deck aircraft.

One existing system employs a solid enveloping shaft and a heavy frame to support numerous pulleys mounted to the elevator cabin and to aircraft structure to move the cabin along guide rails. Such a system uses a heavy infrastructure, thereby requiring a heavy enveloping shaft to mount the infrastructure and guide rails. Even with such heavy structure, this system generally lacks multiple redundant failsafe braking features.

Furthermore, in such systems, the interface between the carriage and guide rails does not provide sufficient support for the cabin to entirely exit the fuselage. Existing railing and interface features can also result in an uneven or rough ride. In addition, the enveloping shaft inside the fuselage inhibits detection of fuselage structural damage, such as cracks and corrosion, from being detected until they propagate past boundaries of the enveloping shaft.

Another system employs a driven three-dimensional vehicle or cart mounted on the upper surface of the carriage, the cart having multiple wheels that can roll along rails. This system employs a motor driving a belt, the cart being fastened to the belt to move therewith. This system is difficult to repair and can be prone to frequent replacement of components that interface between the cart and motor. For example, belts can induce adverse lateral cart and carriage movement or oscillations. Additionally, the belt and the fasteners attaching the cart to the belt, typically require frequent inspections for belt wear and/or fastener degradation.

Typically, existing aircraft elevator designs also exhibit a primary load path toward the upper deck floor structure, significantly transferring load to, and stiffening, the upper deck floor structure. These designs generally do not provide any load limiting features. In such designs, the elevator support structure is usually rigidly attached to the upper deck floor structure. The upper deck floor structure plays an important role in providing support to the fuselage and is subject to heightened fatigue and damage tolerance ratings. This is especially the case in Boeing® 747® aircraft, the fuselage for which is made up of upper and lower portions having two distinct radii, inducing higher stresses and fatigue loading at the region where these two portions meet.

The upper deck floor structure is positioned adjacent or proximate this high stress and fatigue region, and is prone to movement, high stresses, and cyclic loading, during flight and on the ground. Existing proposed designs generally lack a mechanism or method for moderating, inhibiting, and/or limiting the load experienced by the upper deck floor structure as a result of supporting an integrated elevator and its support structure.

Furthermore, existing designs also generally lack a system for correcting the carriage ambient movement caused by fuselage shifting when the carriage is in a lower loading or unloading position near the ground.

In addition, generally conventional integrated elevator designs that use a carriage sized to transport individuals, cargo, and supplies, require excess space in the elevator shaft within the airplane. Therefore, these systems require excess modification to existing fuselage structures, making their installation impractical. To date, none of the existing designs have been practically incorporated in a multi-deck large aircraft such as the Boeing® 747® or multi-deck Airbus® aircraft.

BRIEF SUMMARY

In one embodiment, an elevator system for a fuselage of an aircraft, includes a cabin, at least one fixed rail configured to be coupled to the fuselage structure, at least one floating rail movably coupled with respect to the fixed rail, the cabin being movably coupled to the floating rail, and a first pulley system operable to move the cabin between an upper position and a lower position, the at least one floating rail moving with respect to the fixed rail and the cabin moving with respect to the at least one floating rail during at least a portion of the cabin's movement between the upper and lower positions.

According to one aspect, the first pulley system includes a primary cable, at least one cabin pulley having a first axis of rotation and being mounted toward a central region of an upper wall of the cabin, and at least one upper pulley configured to be mounted to the aircraft toward the upper position, the cabin pulley being movably coupled with respect to the upper pulley via the primary cable.

According to one aspect, the elevator system includes a second pulley system including a secondary cable having a first end coupled to the cabin, and at least one floating pulley rotatably coupled to the floating rail, the second pulley system retracting or winding the secondary cable when the first pulley system extracts or unwinds the primary cable.

According to another embodiment, an aircraft elevator system configured to be mounted to an aircraft fuselage structure, includes a cabin, a movement mechanism configured to move the cabin between an upper position and a lower position, a biasing device, and at least one beam member configured to support a load exerted by the movement mechanism, the biasing device operatively coupled to the beam member and configured to apply a biasing force to the beam member, the biasing force resisting the load up to a threshold magnitude.

According to yet another embodiment, an elevator configured to be installed in an aircraft fuselage to move between an upper position and a lower position adjacent a landing surface, includes a cabin including an interior and an opening configured to facilitate entrance to, and exit from, the interior, the cabin having a lower end configured to be positioned at a spacing distance from the landing surface when the cabin is in the lower position, and a ramp positioned toward the lower end and including a surface extending from adjacent the lower end to adjacent the landing surface, the ramp being pivotably or rotatably coupled to the cabin toward the lower end of the cabin and configured to pivot or rotate about a rotation axis, and to compensate for cabin movement when the cabin is in the lower position.

According to still another embodiment an aircraft elevator system includes a cabin, a primary frame, a secondary frame having upper and lower ends, a first movement device or mechanism configured to movably couple the primary frame to the secondary frame, and a second movement device or mechanism configured to movably couple the cabin to the secondary frame, the cabin configured to move between upper and lower positions, the first and second movement devices moderating movement of the secondary frame and the cabin such that in the upper position the cabin is situated toward the upper end of the secondary frame, and in the lower position the cabin is situated toward or below the lower end of the secondary frame.

BRIEF DESCRIPTION OF THE SEVERAL VIEWS OF THE DRAWING(S)

Figure 2A:
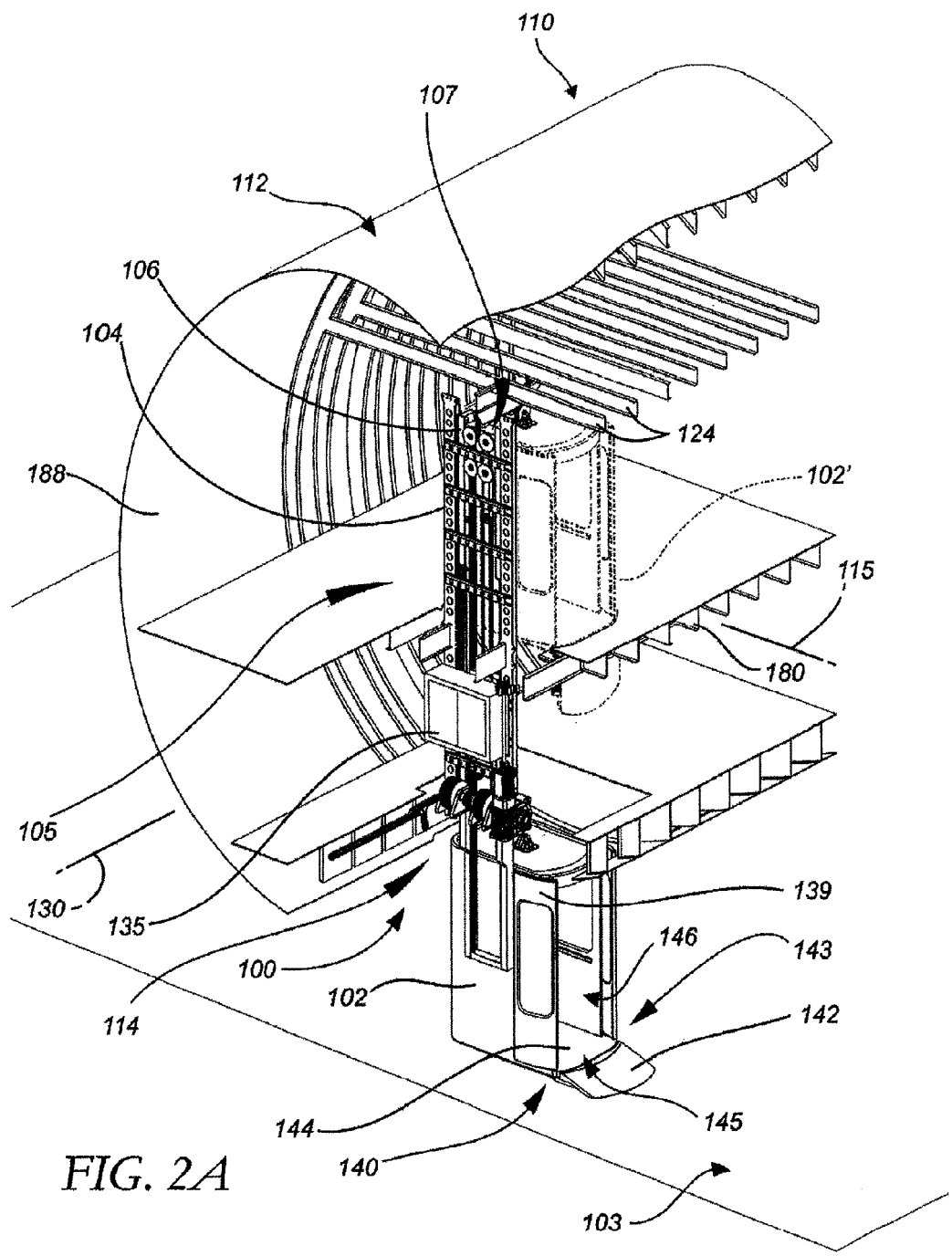
FIG. 2A is an isometric view of the elevator system of FIG. 1, illustrated with a cabin thereof in upper and lower positions, with respect to a cutaway portion of the fuselage, according to one embodiment.
Figure 7A:
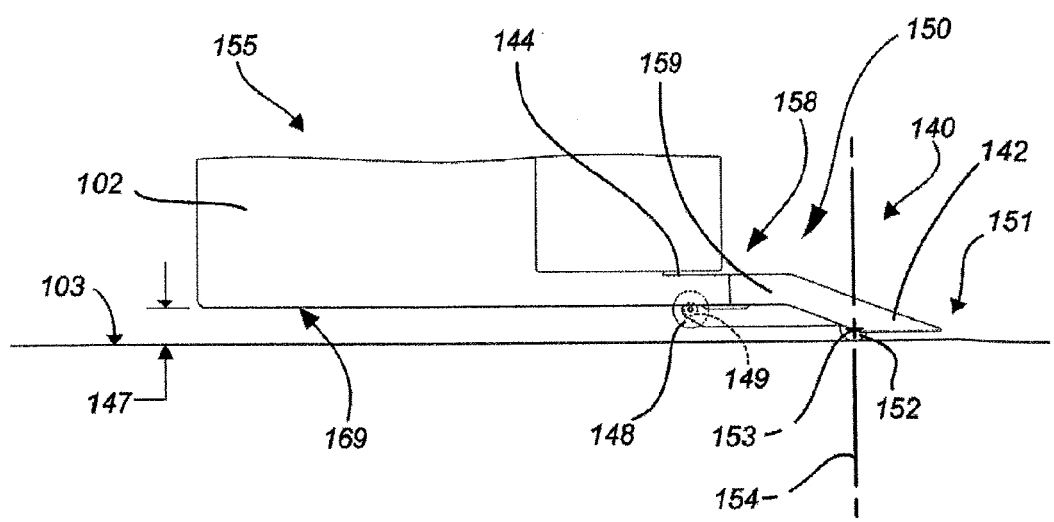
Figure 7B:
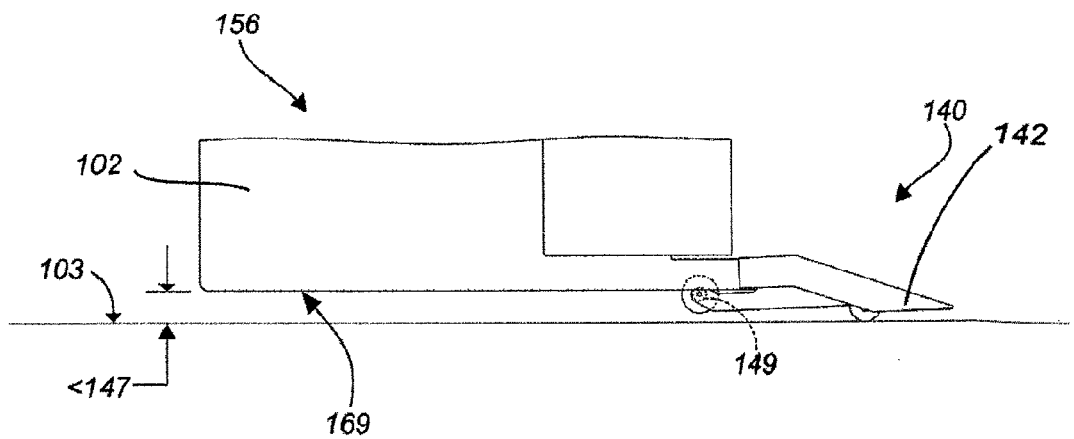
Figure 7C:
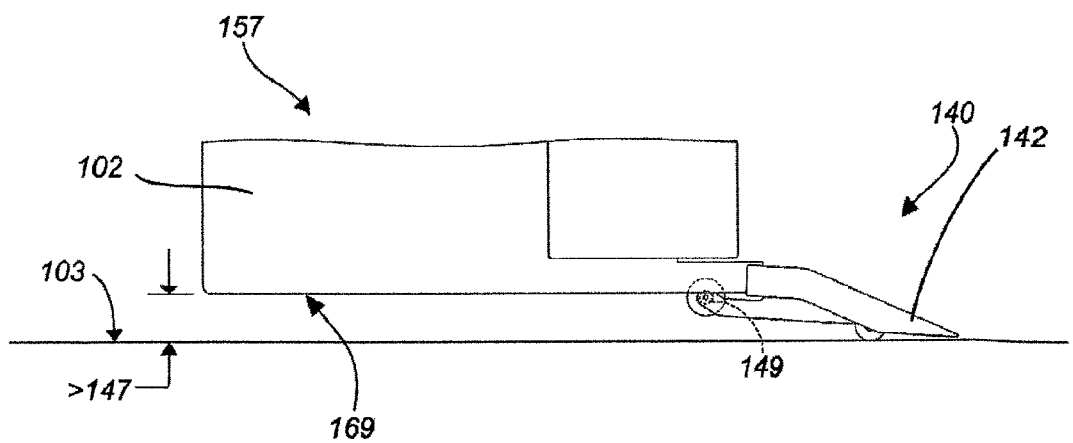

FIGS. 7A, 7B, and 7C illustrate a side view of a lower region of the cabin of FIG. 2A in the lower position and at nominal, over-travel, and under-travel states, respectively, according to one embodiment.

Figure 8A:
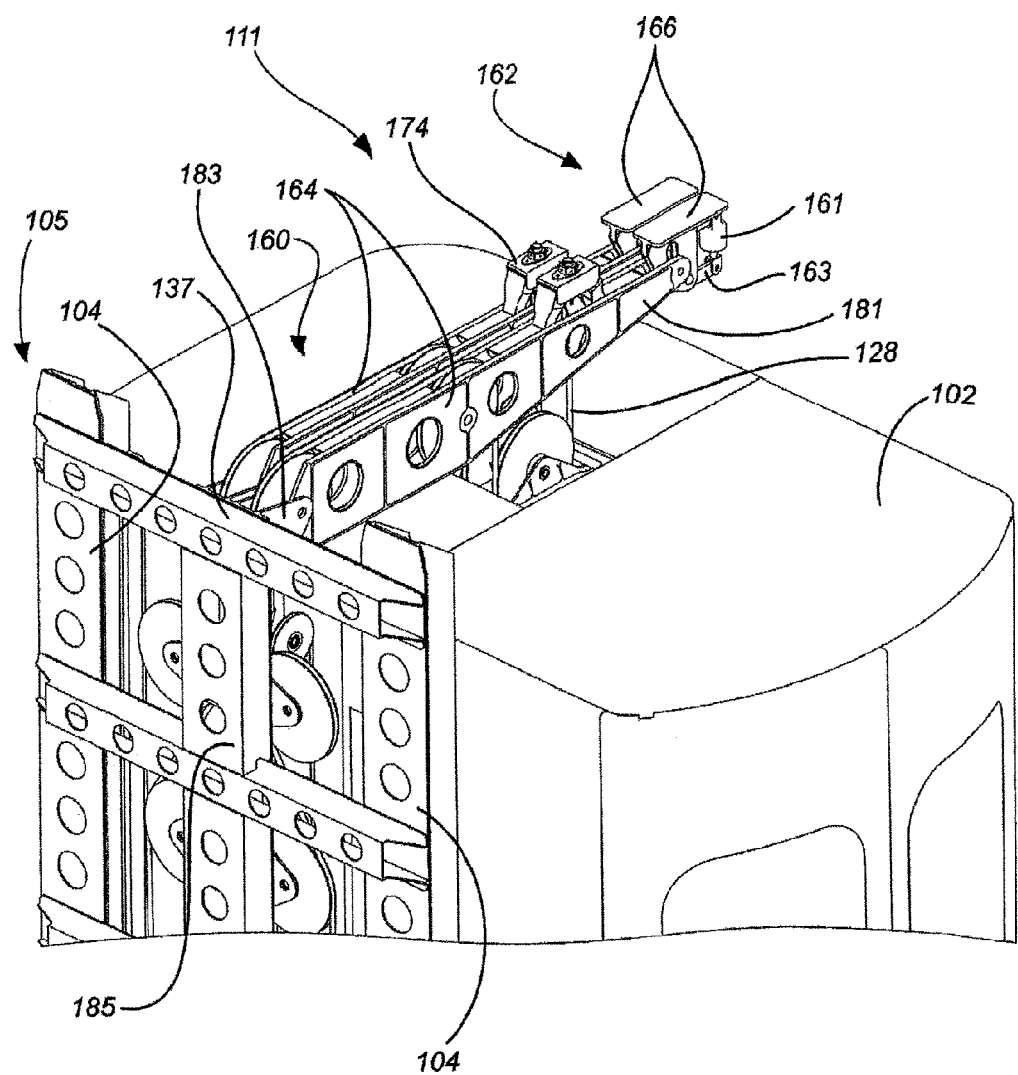

FIG. 8A is an isometric view of a support apparatus of the elevator system of FIG. 2A and a portion of the cabin in the upper position, according to one embodiment.

Figure 8B:
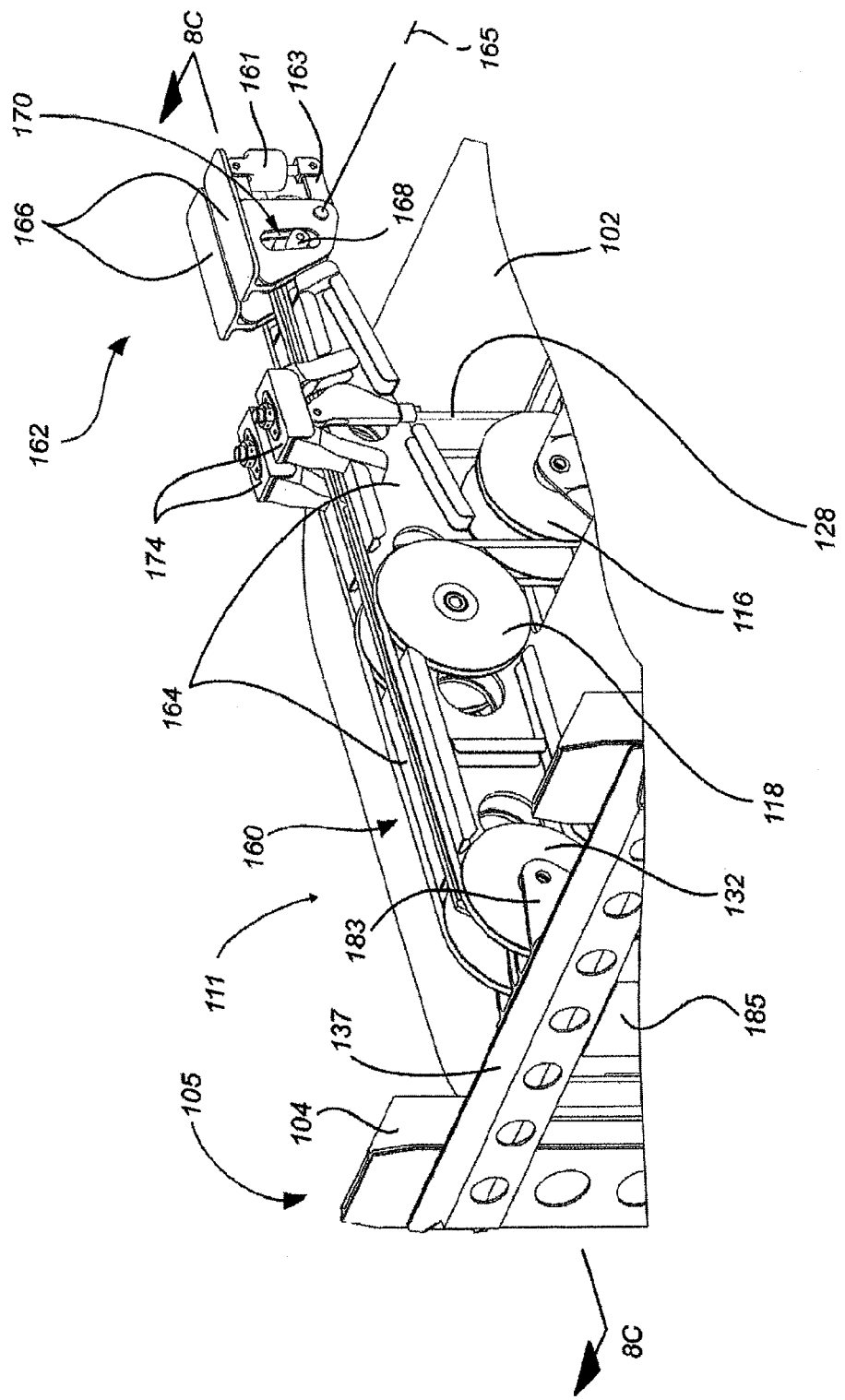

FIG. 8B is an isometric view of a portion of the support apparatus of FIG. 8A, according to one embodiment.

Figure 8C:
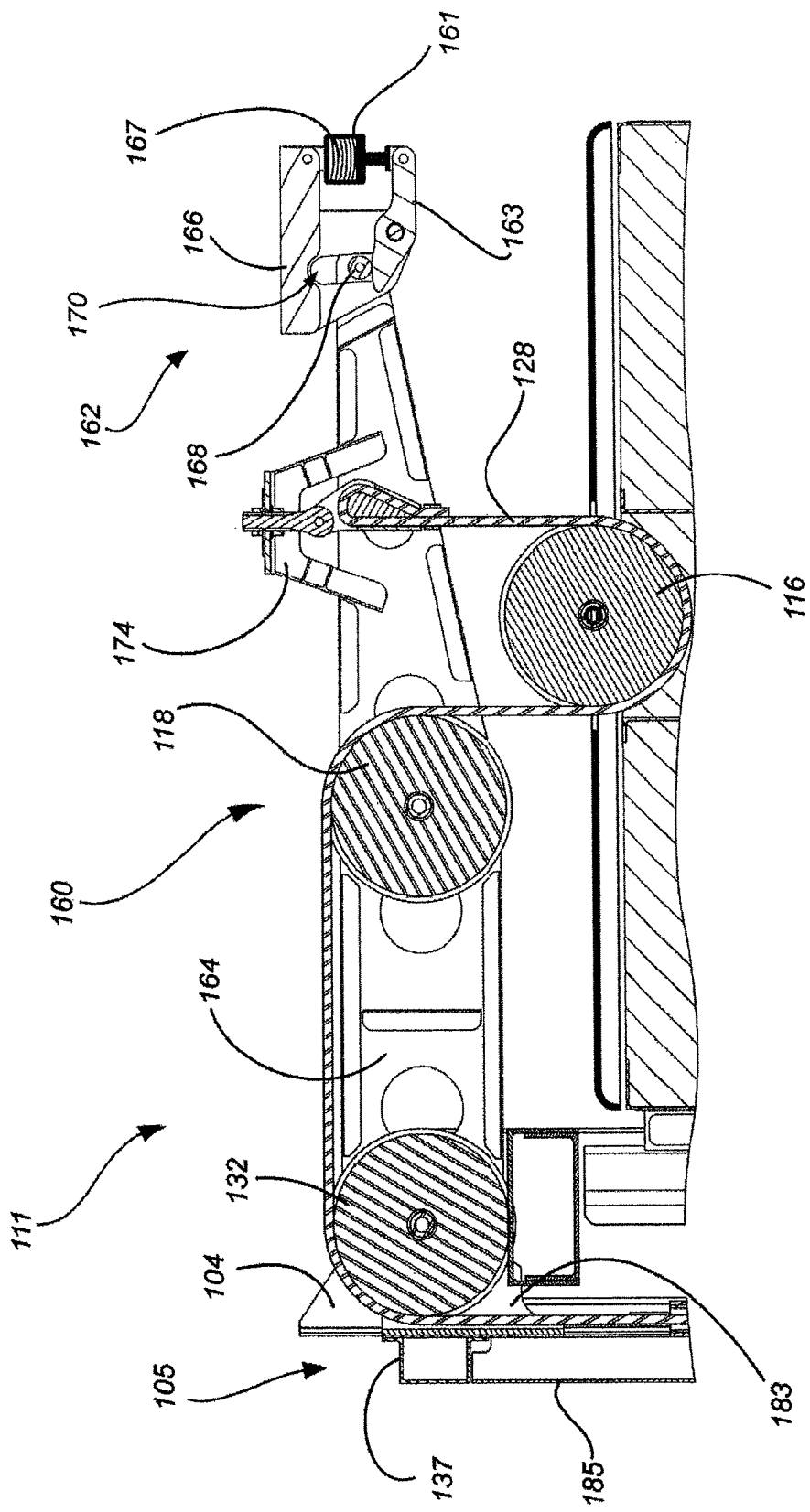

FIG. 8C is a cross-sectional view of the support apparatus of FIG. 8B viewed across Section 8C-8C, according to one embodiment, with a portion removed for clarity of illustration.

Figure 9:
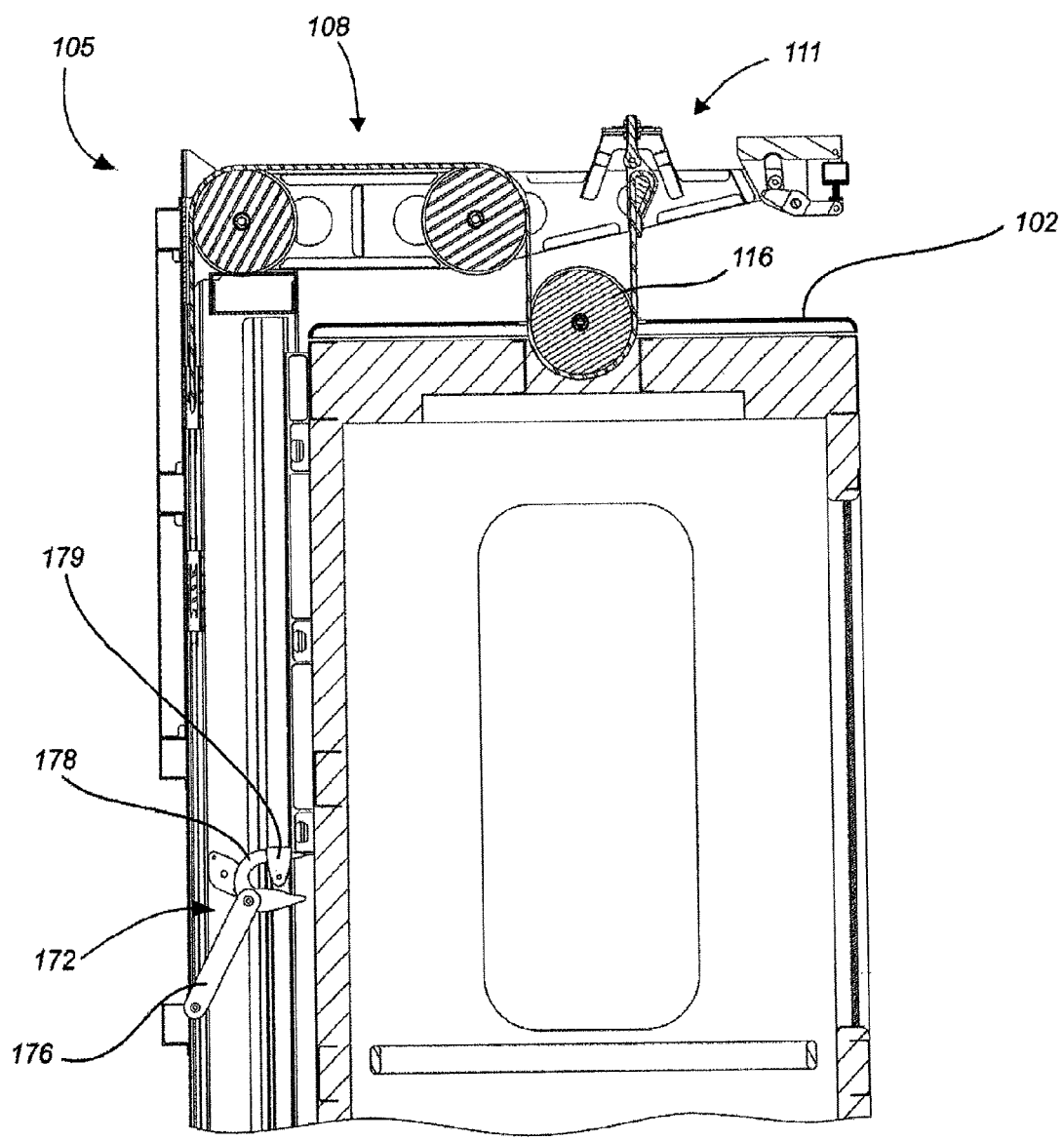

FIG. 9 is the cross-sectional view of the support apparatus of FIG. 8C extended to reveal a retaining feature of the elevator system, according to one embodiment.

Figure 10:
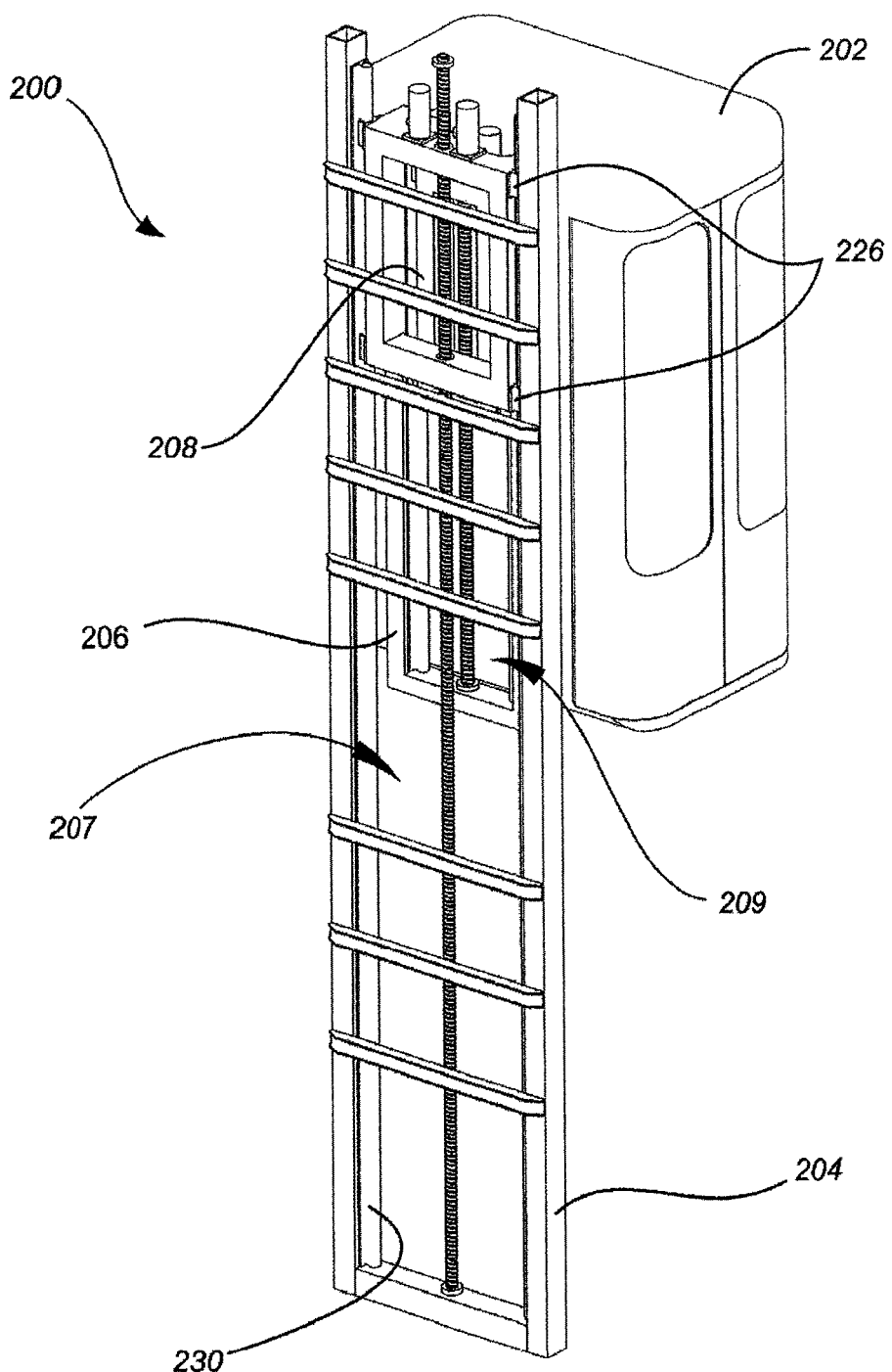

FIG. 10 is an isometric view of an elevator system according to another embodiment, having a ball screw mechanism.

Figure 11A:
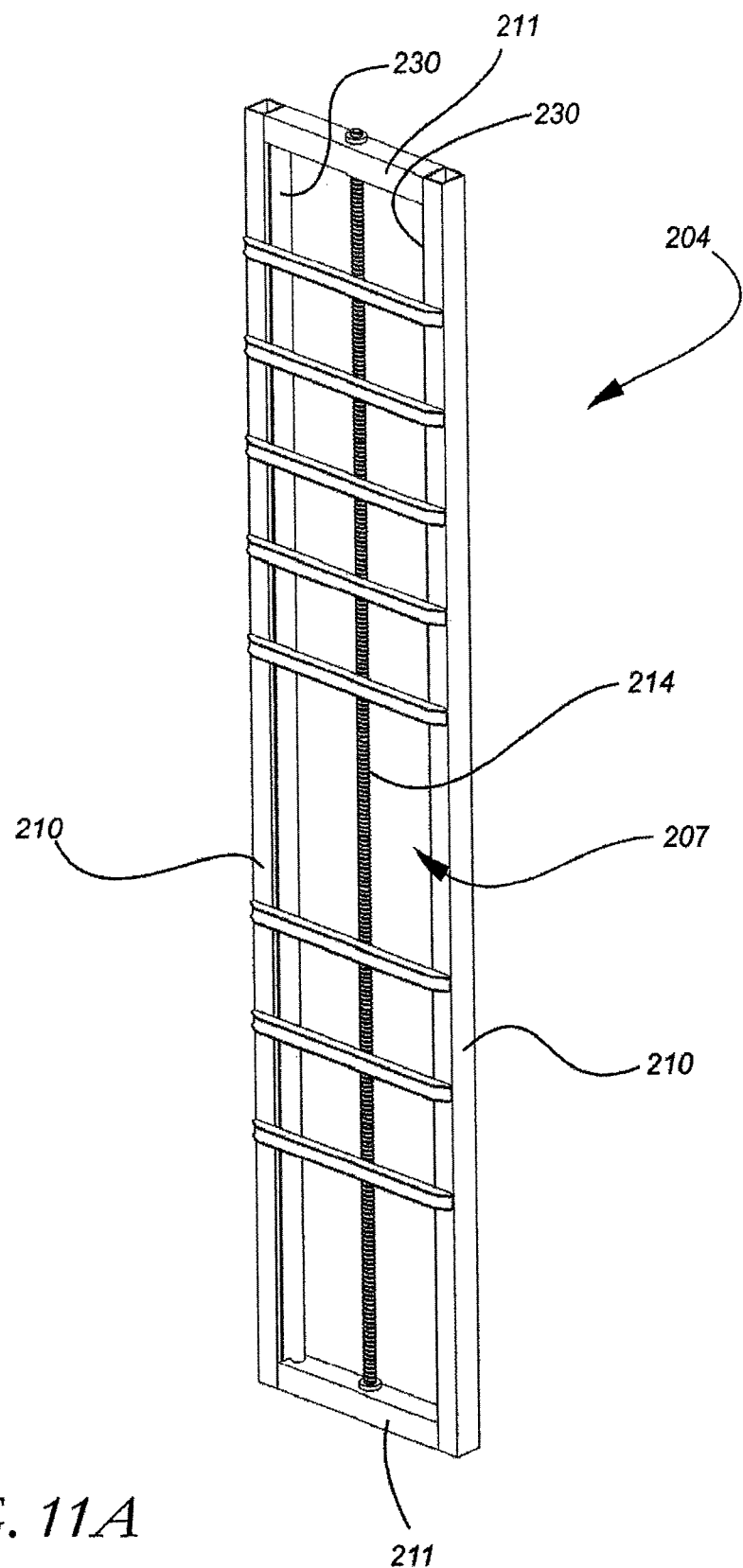

FIG. 11A is an isometric view of a fixed frame of the elevator system of FIG. 10, according to one embodiment.

Figure 11B:
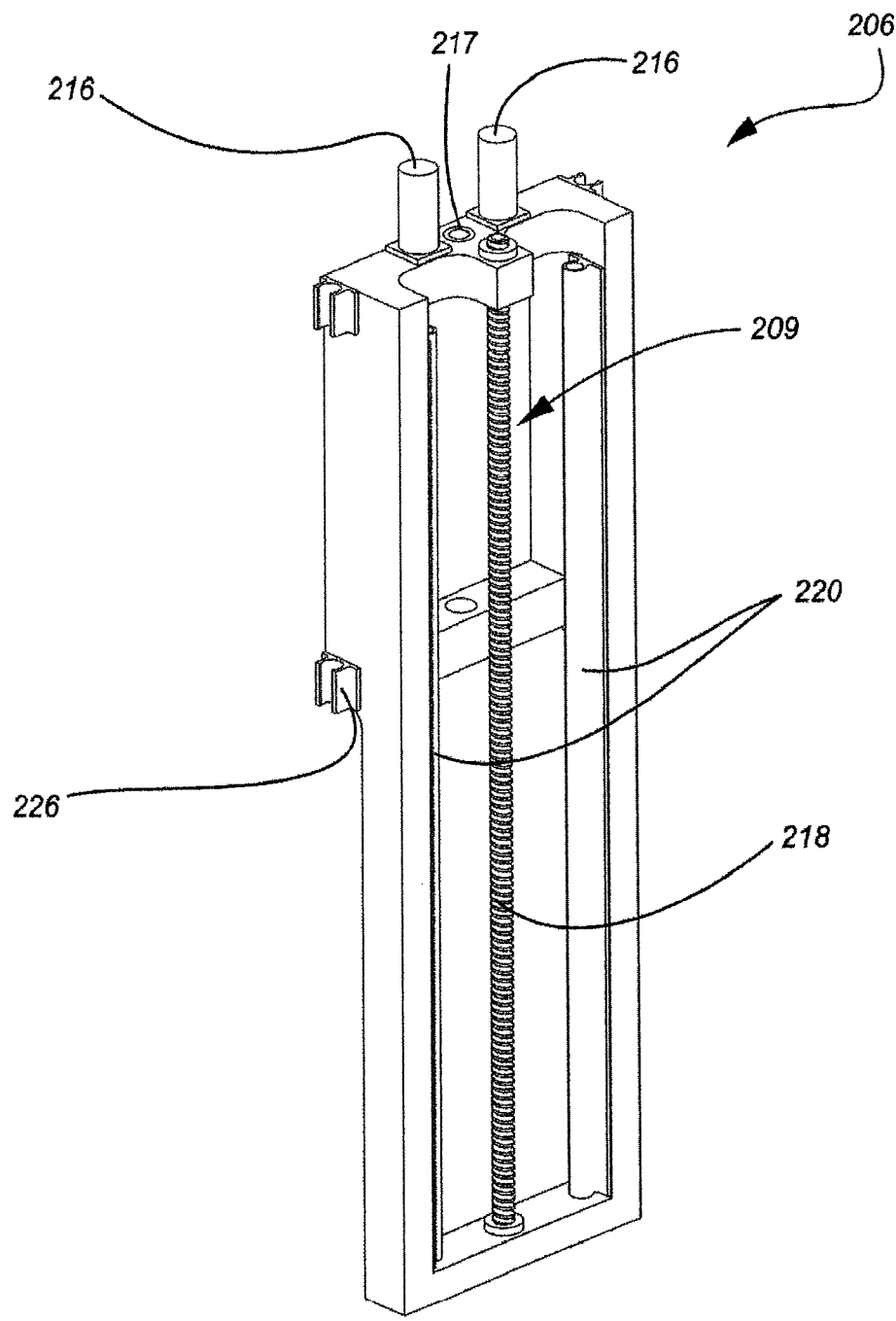

FIG. 11B is an isometric view of a translating frame of the elevator system of FIG. 10 with drive motors and a ball nut, according to one embodiment.

Figure 11C:
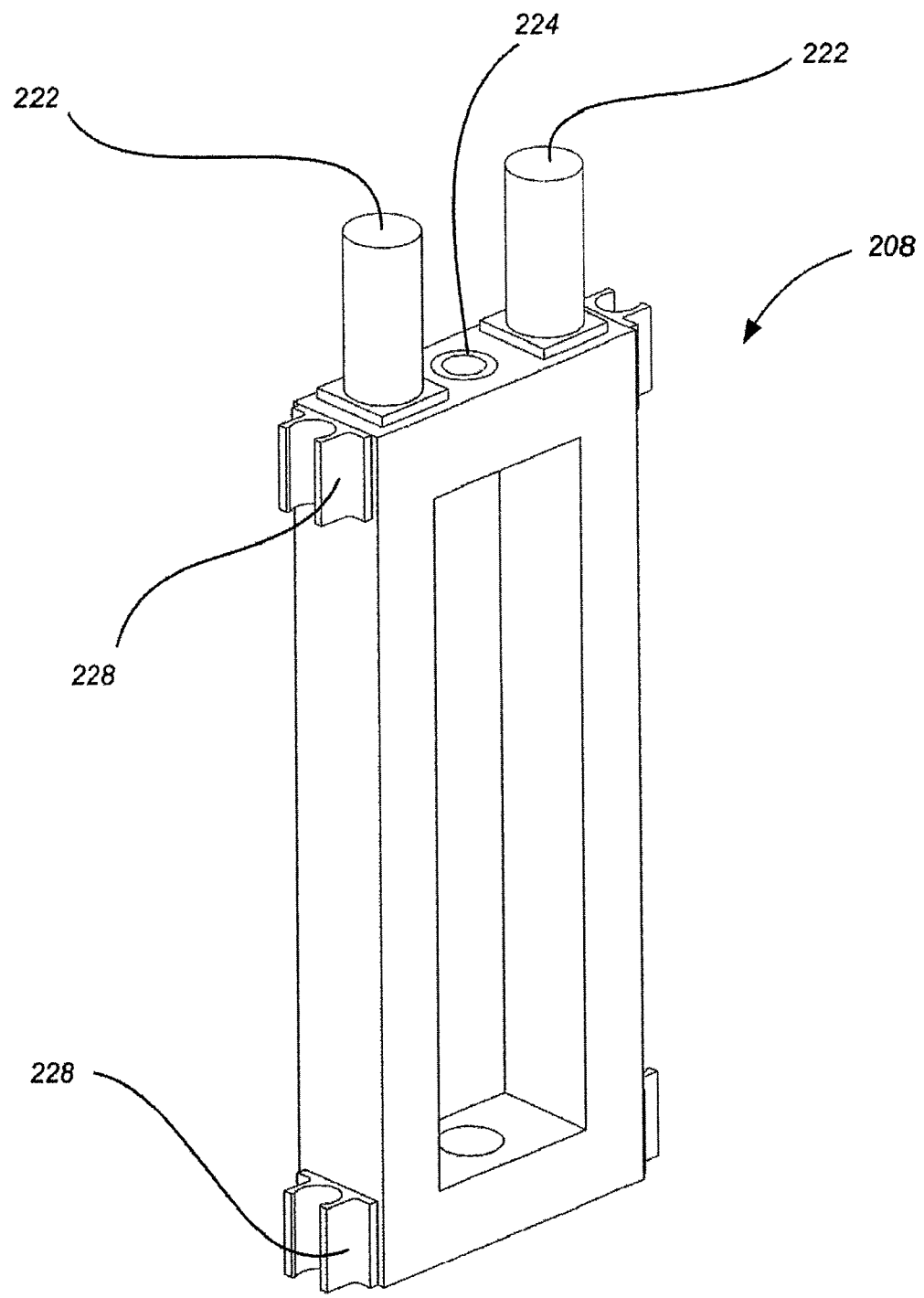

FIG. 11C is an isometric view of a cabin-coupling frame of the elevator system of FIG. 10 with drive motors and a ball nut, according to one embodiment.

Figure 12A:
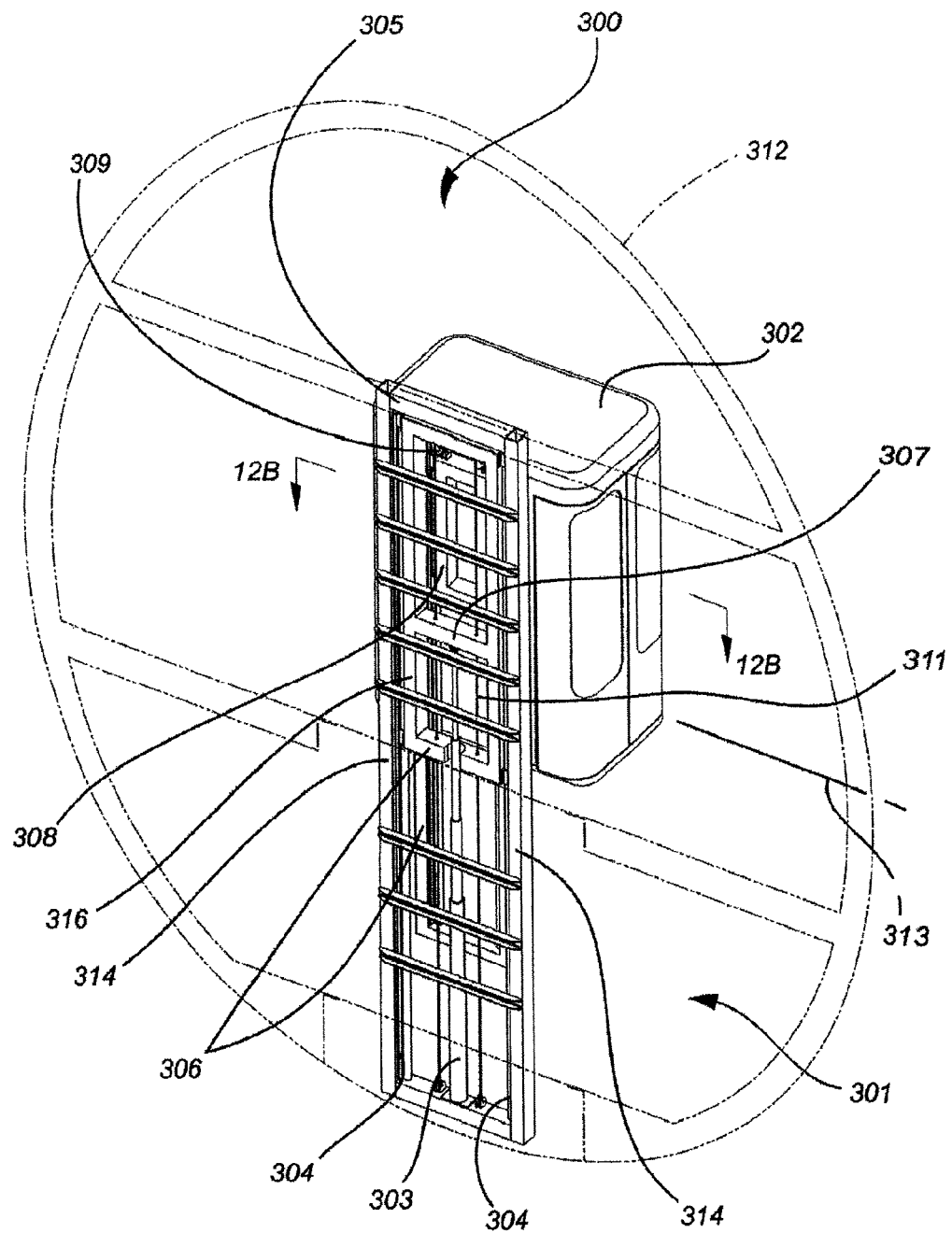

FIG. 12A is an isometric view of an elevator system according to yet another embodiment, having a pressure drive mechanism.

Figure 12B:
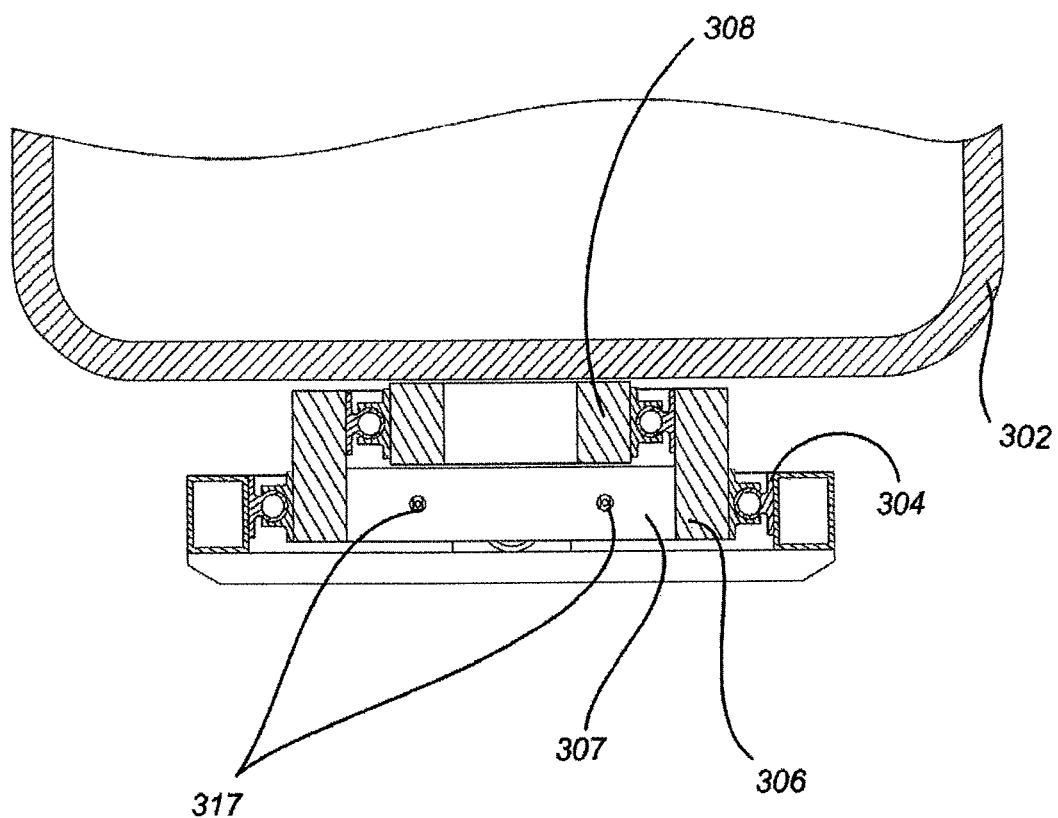

FIG. 12B is a cross-sectional view of a portion of the elevator system of FIG. 12A, viewed across Section 12B-12B, according to one embodiment.

Figure 13A:
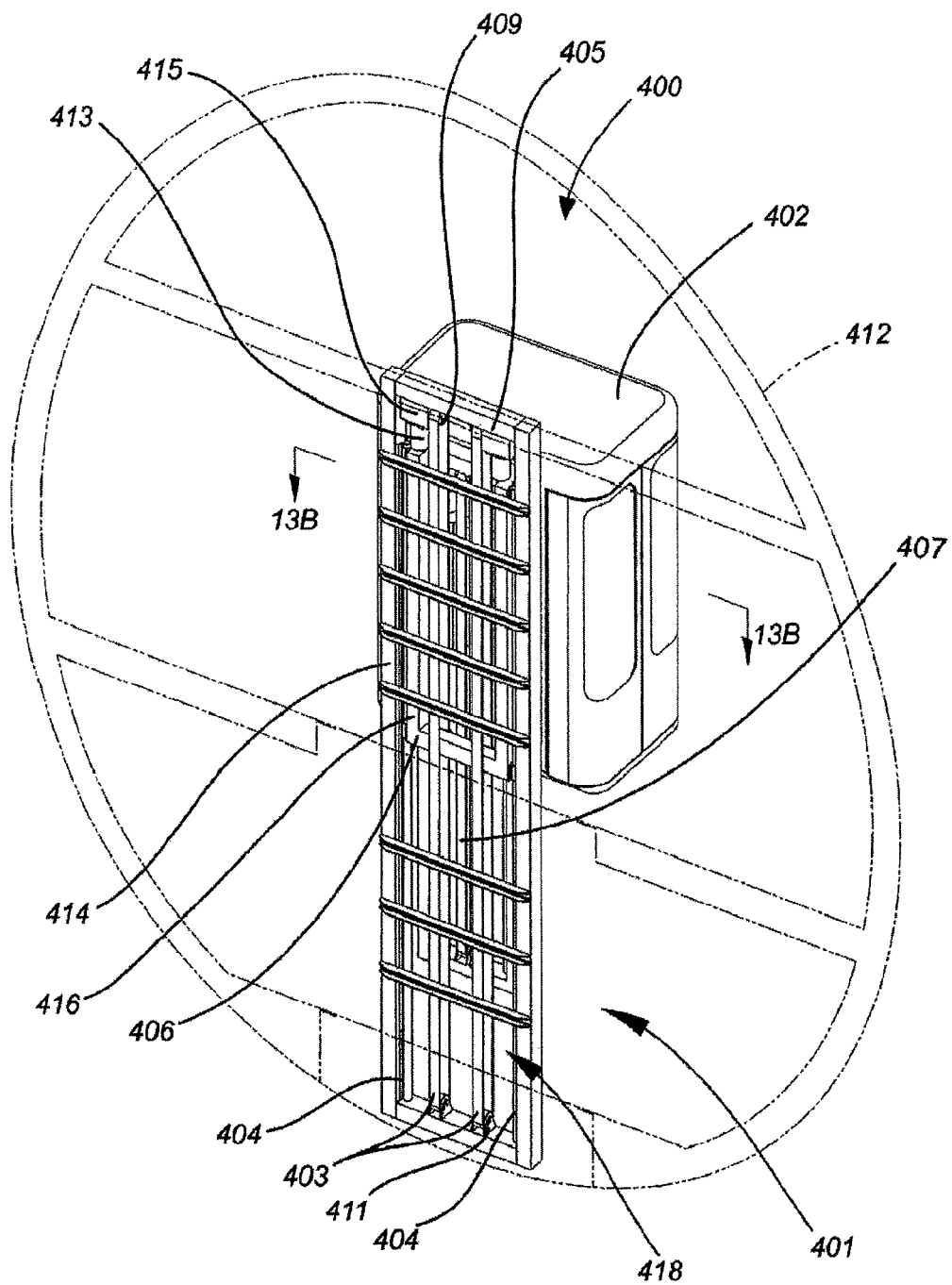

FIG. 13A is an isometric view of an elevator system according to still another embodiment, having a conveyor drive mechanism.

Figure 13B:
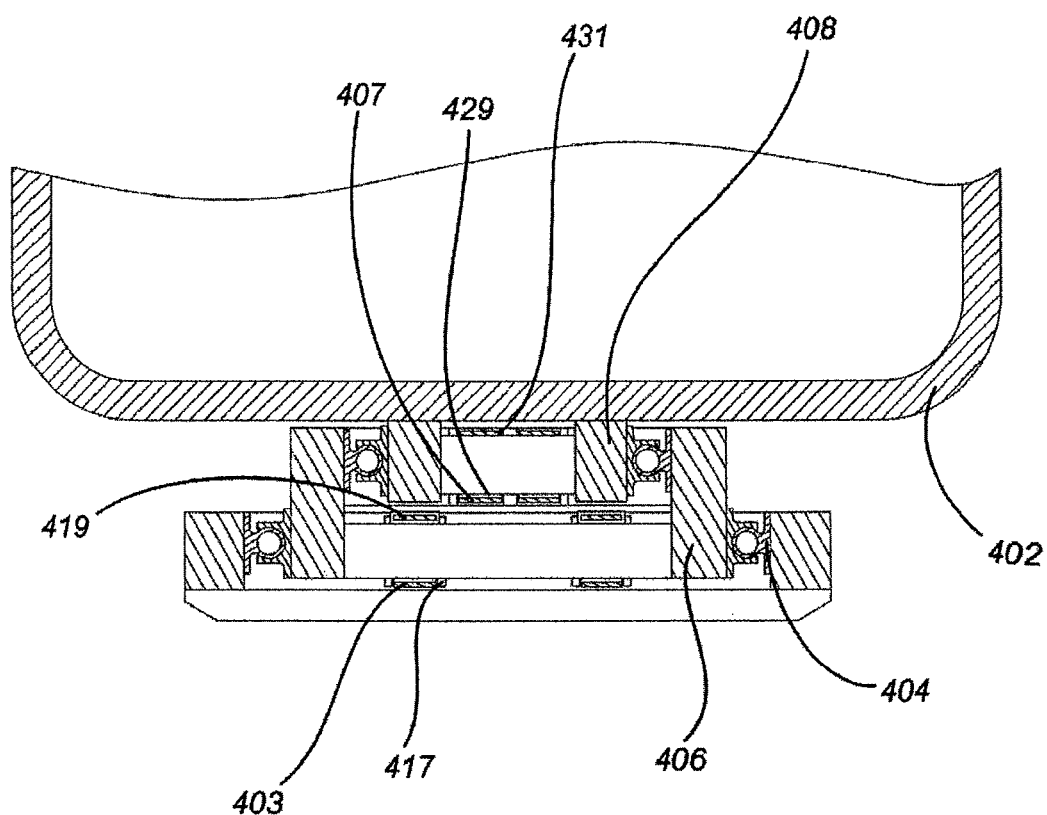

FIG. 13B is a cross-sectional view of the elevator system of FIG. 13A, viewed across Section 13B-13B, according to one embodiment.

Figure 13C:
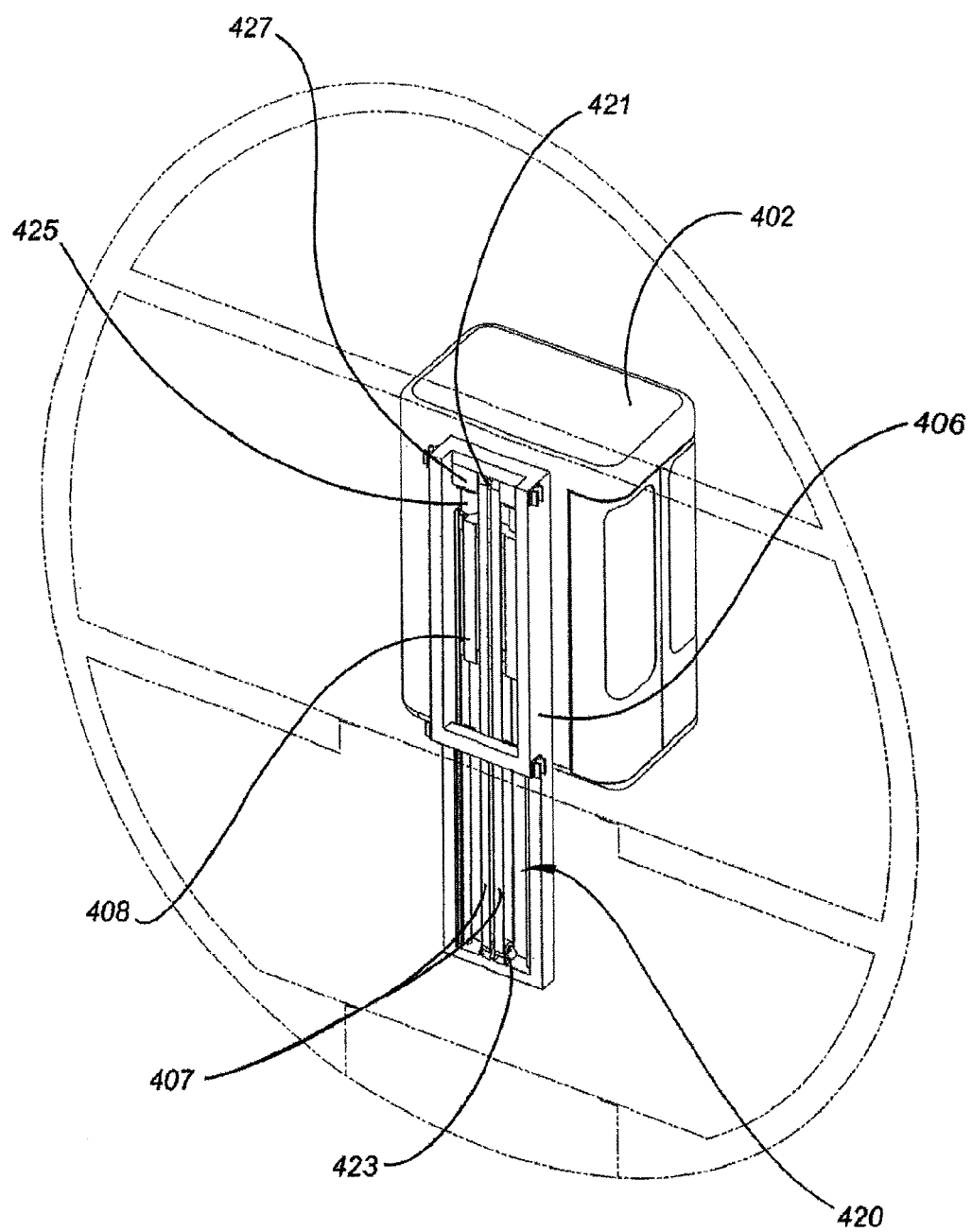

FIG. 13C is an isometric view of a cabin and a portion of a secondary conveyor-drive system of the elevator system of FIG. 13A, according to one embodiment.

DETAILED DESCRIPTION

Figure 1:
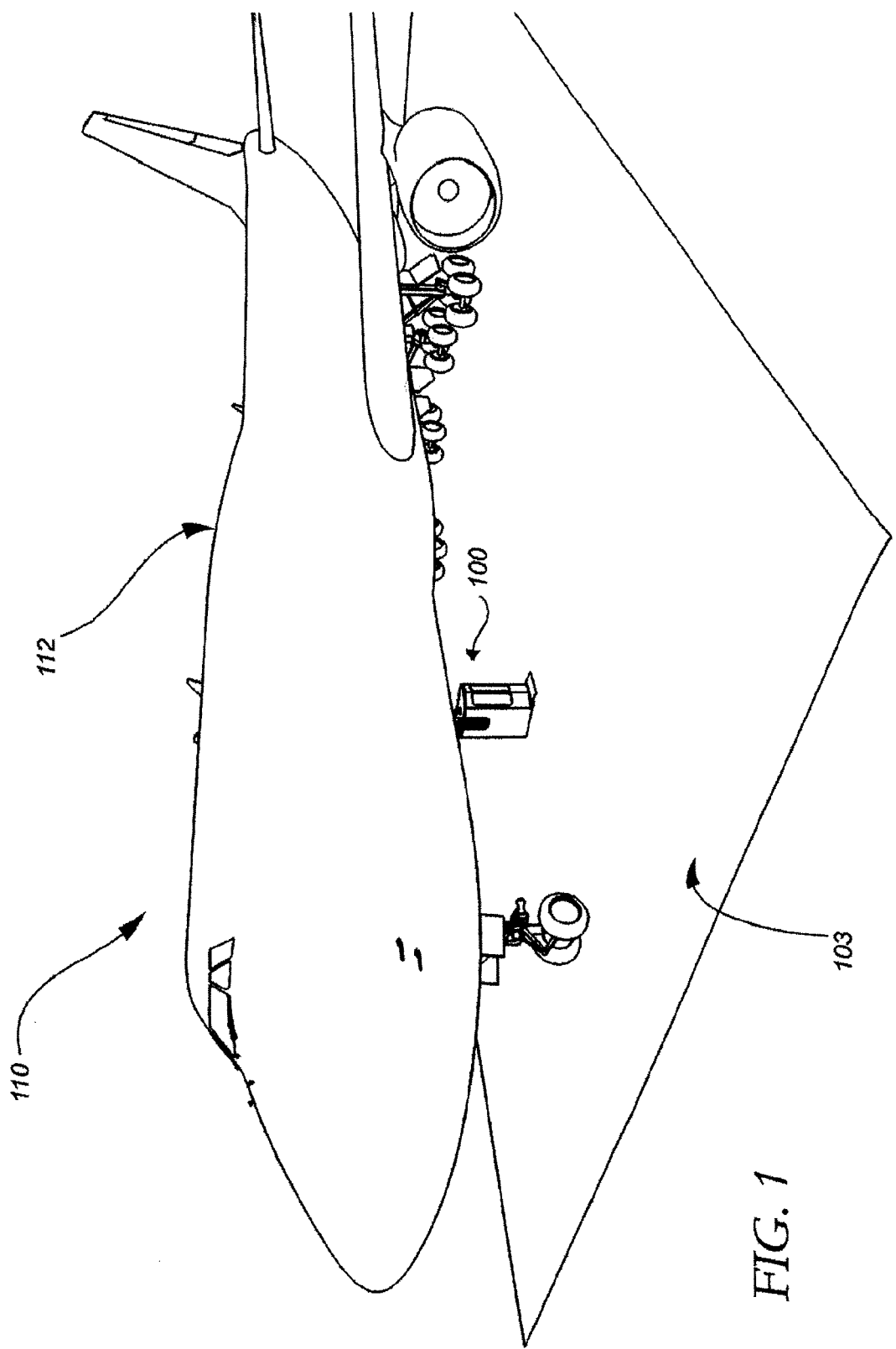
FIG. 1 is an isometric view of an aircraft including a fuselage and an elevator system according to one embodiment.

FIG. 1 illustrates an aircraft 110 including a fuselage 112 and equipped with an elevator system 100 according to one embodiment. The elevator system 100 is configured to comfortably transport individuals and/or objects such as luggage, service carts, and/or wheelchairs, between different levels or decks of the fuselage 112, and/or between any level or deck of the fuselage 112 and a region outside the aircraft 110 such as a landing surface 103 or ground.

FIG. 2A illustrates the elevator system 100 with operation and support features according to one embodiment. For clarity of description and illustration, portions of the fuselage 112 are removed in FIG. 2A.

In one aspect, the elevator system 100 includes a carriage or cabin 102, a fixed or primary frame 105 including at least one, or as in the illustrated embodiment, two fixed or primary rails 104, and a floating or secondary frame 107 including at least one, or as in the illustrated embodiment, two floating or secondary rails 106.

In one embodiment, the elevator system 100 is configured to be installed in a portion of a vessel, such as the aircraft 110, for example, within at least a portion of the fuselage 112. In one aspect, an opening 114 is incorporated in the fuselage 112, for example, proximate a keel or belly region of the fuselage 112 to allow the cabin 102 exit the fuselage 112 toward the landing surface 103. In the illustrated embodiment, the opening 114 is substantially centered with respect to the fuselage 112 along a lateral or pitch axis 115 of the fuselage 112.

Figure 2B:
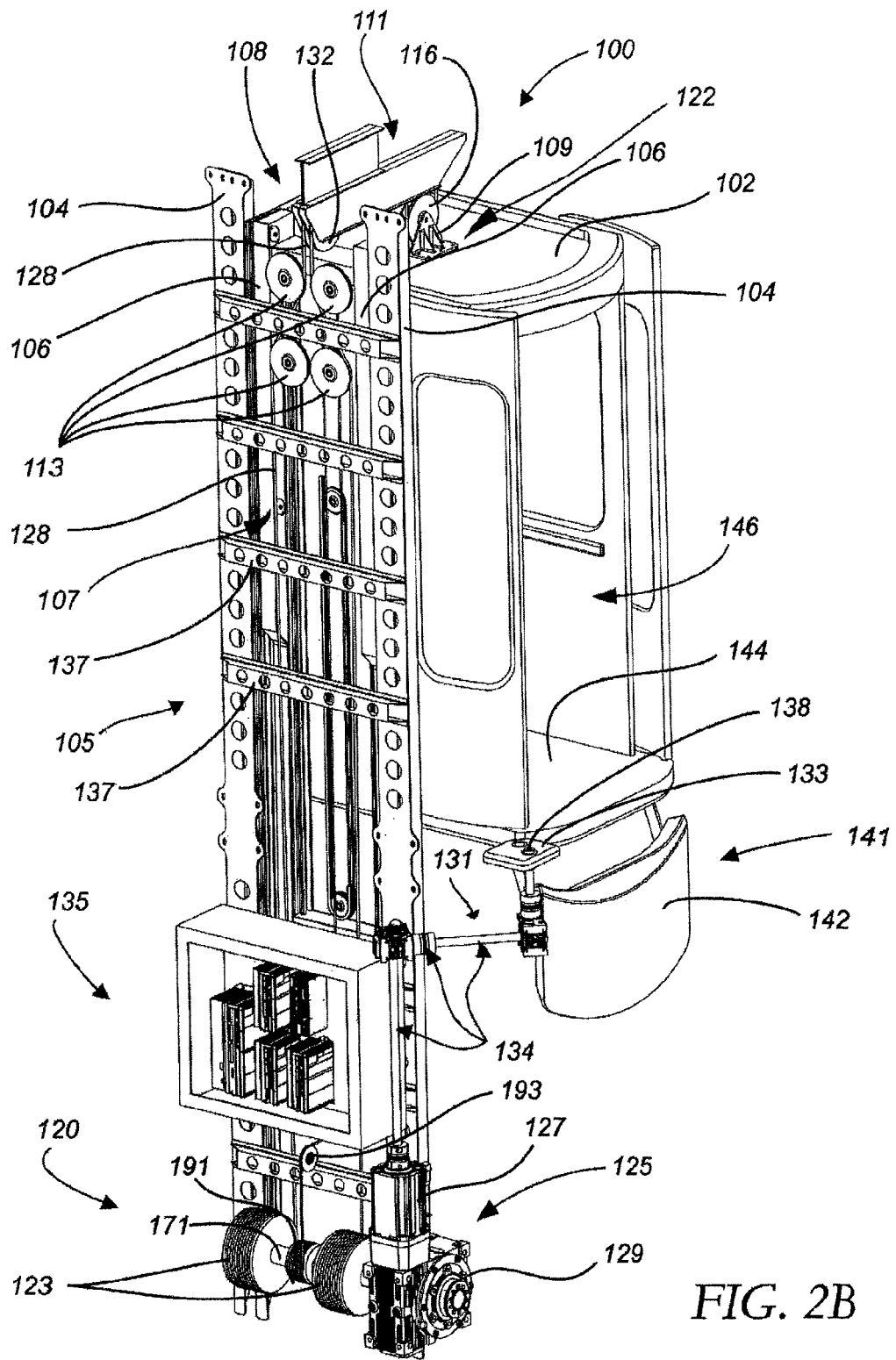
FIG. 2B is an isometric view of the elevator system of FIG. 2A, illustrated with the cabin in the upper position, according to one embodiment, with the fuselage removed for clarity of illustration.
Figure 2C:
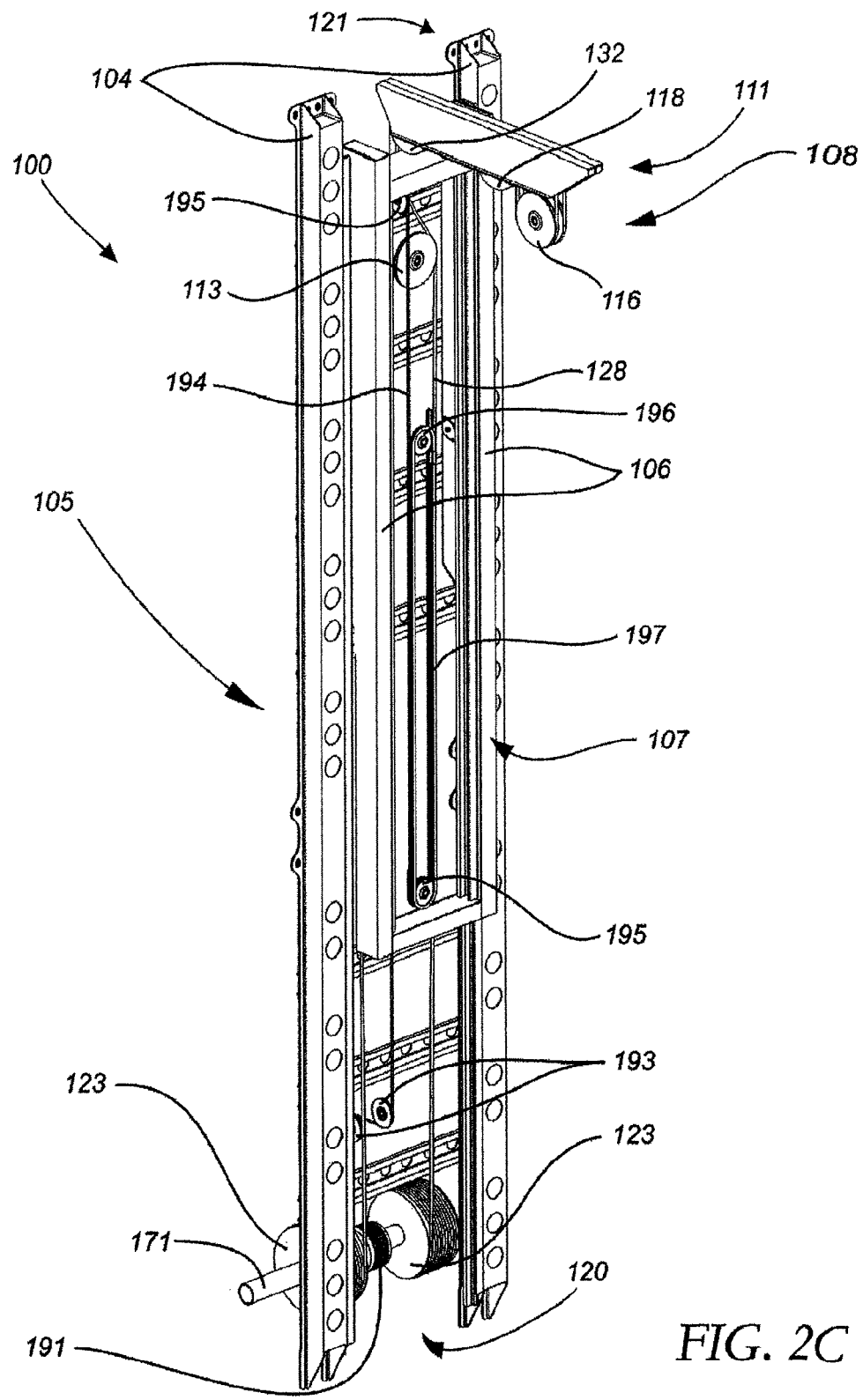
FIG. 2C is an isometric view of fixed and floating railing assemblies of the elevator system of FIG. 2B, according to one embodiment, illustrated with the cabin and fuselage removed for clarity of illustration.

FIGS. 2B and 2C more clearly illustrate an embodiment of the cabin 102, the fixed frame 105 having two fixed rails 104, and the floating frame 107 having two floating rails 106. The fuselage 112 is removed in FIG. 2B, and the fuselage 112 and cabin 102 are removed in FIG. 2C, for clarity of description and illustration. In one embodiment, the floating rails 106 can be fixedly coupled to the cabin 102, and movably or slidably coupled to the fixed rails 104. In another embodiment, the cabin 102 can be movably coupled to the floating rails 106 as discussed further below. In one aspect, the system 100 includes a first pulley system 108. The first pulley system 108 can be operated to move the cabin 102.

In one embodiment, the first pulley system 108 includes at least one cabin pulley 116, at least one upper pulley 118, and at least a first actuating system 120. The first actuating system 120 may include any suitable device, apparatus, and/or unit configured to impart motion to the first pulley system 108 and the cabin 102. In one embodiment, the first actuating system 120 includes a winch system having at least one, or as in the illustrated embodiment, two primary drums 123. As illustrated in FIG. 2B, the actuating system 120 can further include a drive mechanism 125, such as a motor 127 and/or a transmission 129 operatively coupled or mounted between the motor 125 and the primary drums 123. For example, the motor 125 and/or the transmission 129 can be coupled to the primary drums 123 via a drive shaft 171. Other suitable drive mechanisms or drive components are contemplated to be within the scope of the present disclosure.

The first pulley system 108 includes primary cables 128 that extend via the cabin pulley 116 and upper pulley 118, to the first actuating system 120. The first actuating system 120 can be configured to selectively and automatically, based on controlled parameters, retract the primary cables 128, or allow unwinding thereof, to move the cabin 102. The primary cables 128 can be redundant, for example dual redundant, for fail-safety and ride quality purposes.

In one embodiment, the cabin pulley 116 is positioned toward, proximate, or at a central region of the upper wall 122 of the cabin 102, and aligned with the upper pulley 118 such that the primary cables 128 extend generally or substantially perpendicular to a longitudinal or roll axis 130 (FIG. 2A). In this configuration, weight of the cabin 102 is balanced about the cabin pulley 116. This configuration eliminates the need to incorporate excess pulleys facing different directions, and mounted to excessively heavy and space-consuming infrastructure, as is the case with existing designs. The positioning of the upper pulley 118 and cabin pulley 116 also minimizes complicated modifications to existing structure within fuselage 112, thereby reducing labor, parts, costs, completion time, and excess certification efforts.

As illustrated in FIGS. 2B and 2C, in one embodiment, the first pulley system 108 may include one or more guide pulleys 132 to assist in guiding the primary cables 128. In one embodiment, the pulleys 116, 118, 132 and/or primary drums 123 can include a sheave, bobbin, roller, roller frame, support fittings, gears, or any other suitable pulley or drum structure, or any combination thereof. In one aspect, the cabin pulley 116 and/or upper pulley 118 may include a circumference secured to a hub via at least one, and in some embodiments, a plurality of spokes, contributing to further weight reduction as compared to solid body pulleys or drums.

In one embodiment, the cabin pulley 116 can be directly or indirectly rotatably coupled to, or with respect to, the cabin 102, for example to an upper wall 122 of the cabin 102. In the illustrated embodiment, the first pulley system 108 includes a pair of cabin pulleys 116 mounted on an attachment fitting 109. Furthermore, in the illustrated embodiment, the first pulley system 108 includes a pair of upper pulleys 118 and a pair of guide pulleys 132. The upper and guide pulleys 118, 132 guide the primary cables 128 toward the first actuating system 120.

In some embodiments, the first pulley system 108 may include alignment pulleys 113 coupled between the guide pulleys 132 and the primary drums 123 to align the separation of the primary cables 128 with a suitable width between the primary drums 123. For example, in the illustrated embodiment, the primary drums 123 are farther apart from each other than are the guide pulleys 132. The alignment pulleys 113 in the illustrated embodiment are configured to distance the primary cables 128 as they emerge from the upper pulleys 118 to align the primary cables 128 with the primary drums 123.

Figure 4:
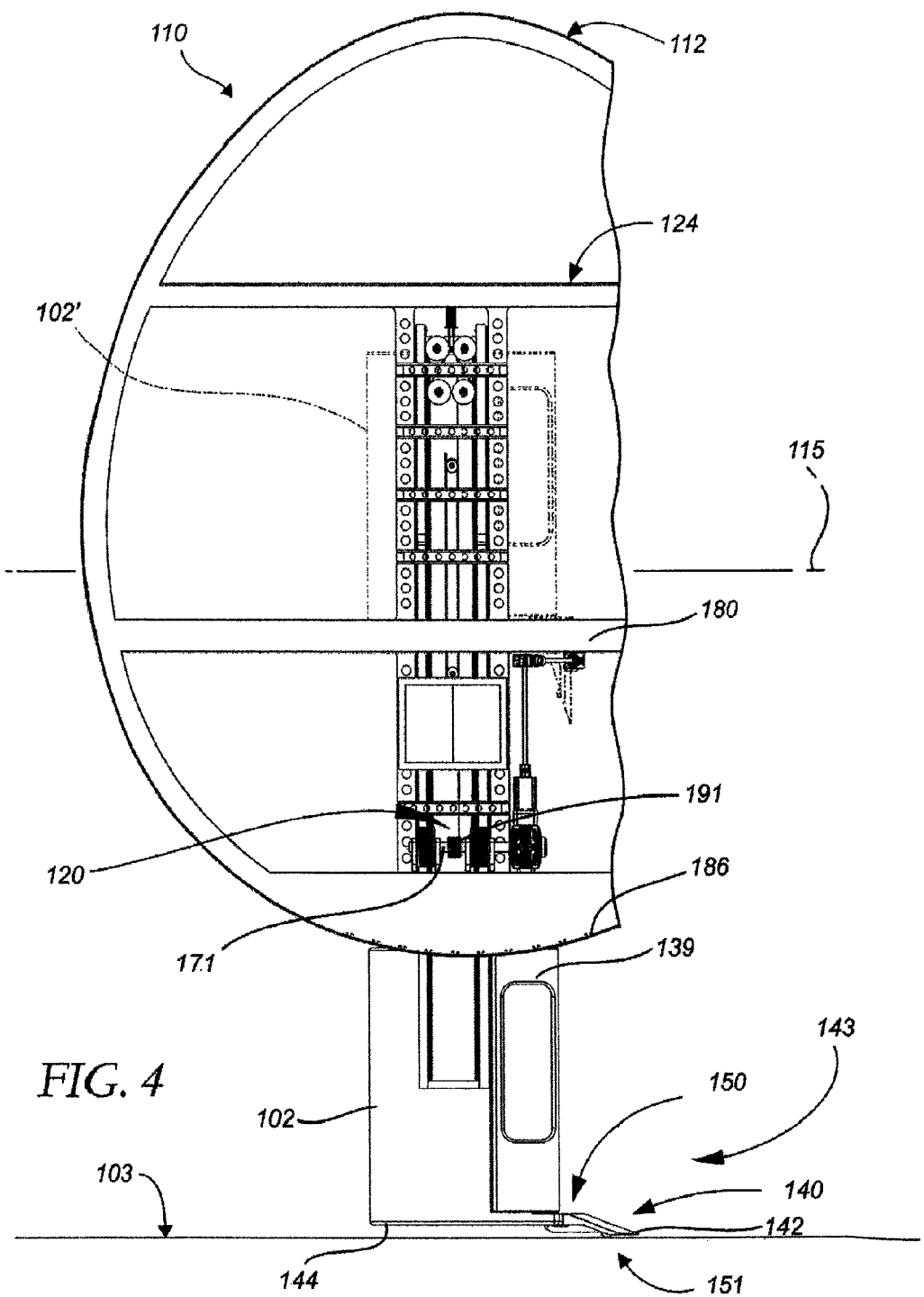
FIG. 4 is a cross-sectional end view of the fuselage and the elevator system of FIG. 2A, with the cabin illustrated in the upper and lower positions, according to one embodiment.

As illustrated in FIGS. 2A and 4, in one embodiment, the cabin 102 is movable between first and second positions. For example, in one aspect, the first position corresponds to a lower position (shown in solid lines) in which at least a portion of the cabin 102 is outside of the fuselage 112, for example, adjacent or proximate the landing surface 103. In one aspect, the second position corresponds to an upper position (shown in broken lines) in which the cabin 102 can be in the fuselage 112, for example, above a passenger deck. For clarity of description and illustration, the first and second positions will hereinafter be referred to as lower and upper positions, respectively. In some embodiments, the cabin 102 is moveable with respect to the floating rails 106.

Figure 5:
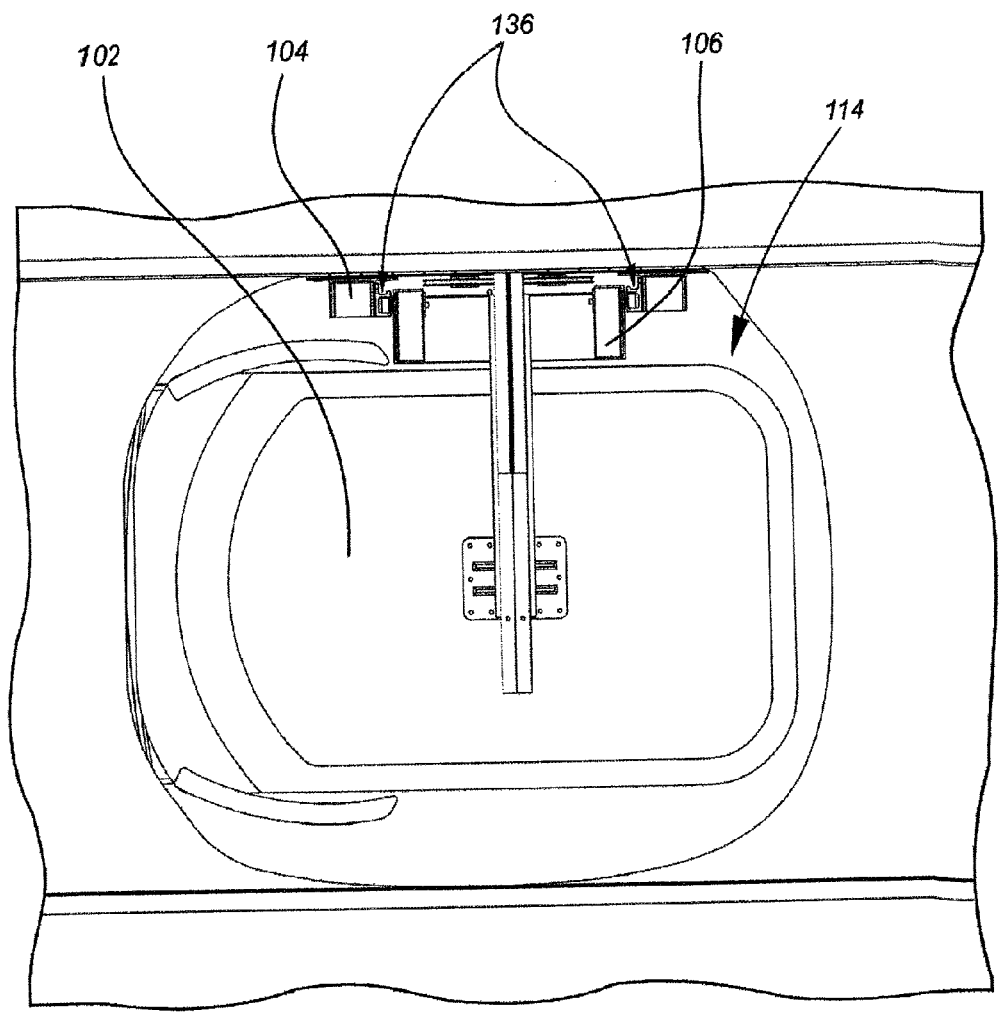
FIG. 5 is a plan view of a portion of the elevator system of FIG. 2A, according to one embodiment.

As illustrated in FIG. 5, the floating rails 106 can be slidably coupled to the fixed rails 104 via at least one sliding coupling member 136. In some embodiments, the floating rails 106 can be slidably coupled to the fixed rails 104 at one or more locations, or be continuously slidably coupled to the fixed rails 104 along substantially the entire length of the floating rails 106. The coupling member 136 can include balls, bearings, sliders, and/or ball slides, such as linear ball slides, electromagnets of opposing polarity, and/or any other suitable slidable coupling member, or any combination thereof.

In other embodiments, the floating rails 106 can be movably coupled to the fixed rails 104 via a drive mechanisms and/or a floating rail pulley system similar to the first pulley system 108 except that instead of a cabin pulley it would include a pulley rotatably coupled to the floating frame 107.

In some embodiments, during operation, the cabin 102 can be stationary with respect to the floating rails 106 for a travel duration or distance of the floating rails 106 with respect to the fixed rails 104. For example, in some embodiments, the cabin 102 can travel with, and be stationary with respect to, the floating rails 106 until the floating rails 106 reach a threshold position, for example adjacent or proximate the opening 114. When the floating rails 106 reach their lowest position, in an aspect, the cabin 102 may then translate with respect to the floating rails 106 to be lowered toward the landing surface 103.

In other embodiments, during operation, the first pulley system 108 can be operated to move the cabin 102 up and/or down as the floating rails 106 simultaneously move with respect to the fixed rails 104. In one aspect, the cabin 102 can move with respect to the floating rails 106 in response to gravity and via a secondary pulley system 190 (FIG. 2D) as the primary drums 123 unwind the corresponding primary cable 128.

Figure 2D:
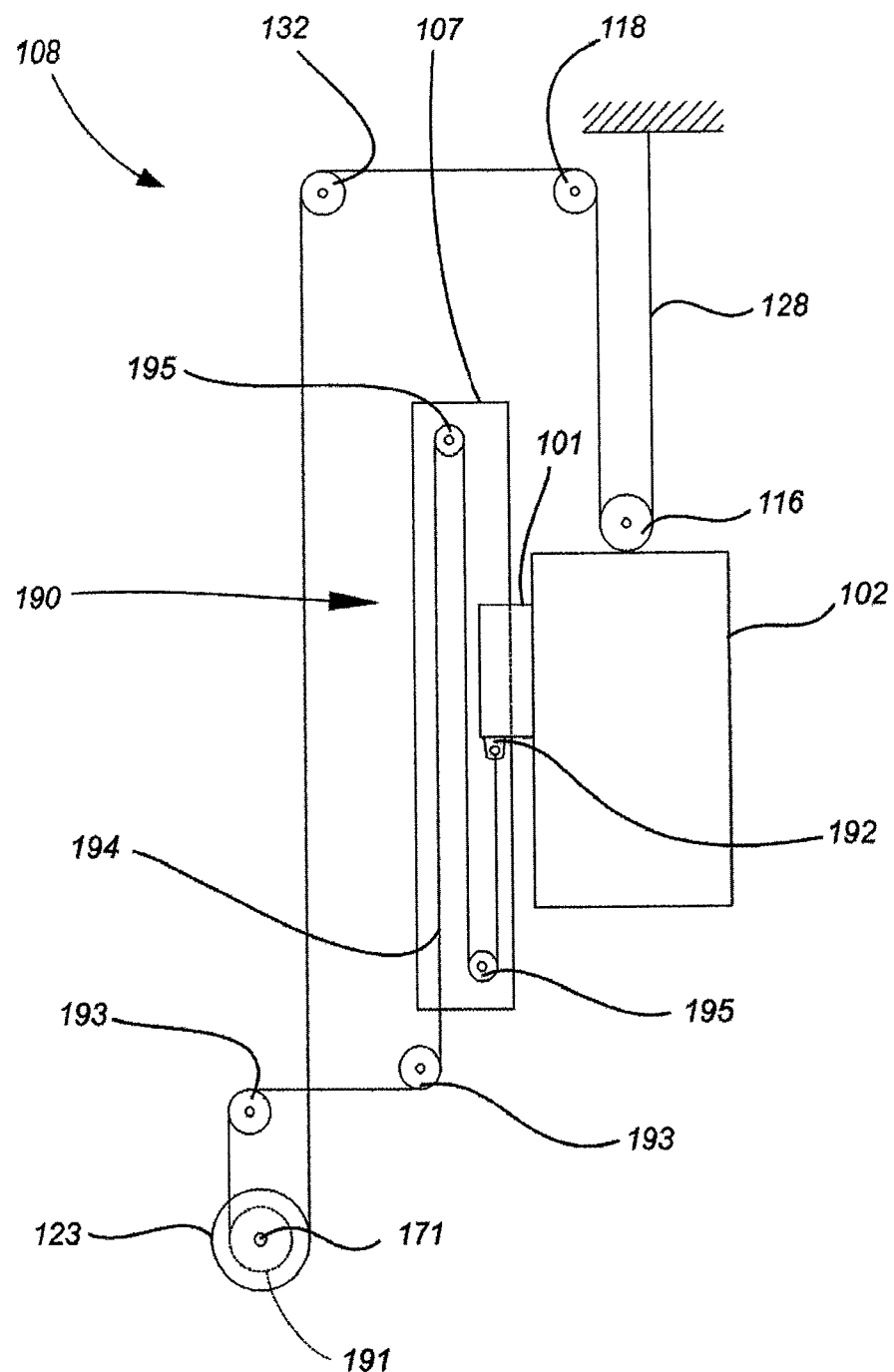
FIG. 2D is a schematic view of portions of the elevator system of FIG. 2A and a pulley system, according to one embodiment.

In one embodiment, as illustrated in FIG. 2C and schematically illustrated in FIG. 2D, the second pulley system 190 can be configured to movably couple the floating frame 107 with respect to the fixed frame 105 and the cabin 102. FIG. 2D schematically illustrates the first pulley system 108, the second pulley system 190, the floating frame 107, and the cabin 102. Portions of the second pulley system 190 are illustrated in FIG. 2C.

With reference to FIGS. 2B through 2D, the second pulley system 190 includes at least one secondary drum 191 rotatably mounted to, or with respect to, the fixed frame 104. In the illustrated embodiment, the secondary drum 191 is mounted on the drive shaft 171 on which the primary drums 123 of the first pulley system 108 are mounted. In other embodiments, the secondary drum 191 can be mounted on a distinct drive shaft controlled by distinct actuating system or motor. Mounting the primary drums 123 and secondary drum 191 on the same drive shaft, however, can contribute to further weight reductions.

In one embodiment, the second pulley system 190 can include at least one floating pulley, or as in the illustrated embodiment, two floating pulleys 195. In one aspect, the floating pulleys 195 are rotatably coupled to the floating frame 107, for example, via any suitable coupling members, such as brackets, stiffeners, transverse members, stanchions or any other suitable structure (not shown). The floating pulleys 195 can be movably coupled to the secondary drum 191 with at least one secondary cable 194. In one aspect, a first end of the secondary cable 194 is coupled to the cabin 102, for example, at an anchor or anchor point 192 (FIG. 2D). The anchor 192 can be directly coupled to the cabin 102, or as in the illustrated embodiment, coupled to a cabin-coupling member 101.

In one aspect, the cabin coupling-frame 101 is fixedly coupled to the cabin 102 and movably and/or slidably coupled to the floating frame 107 via any manner and/or devices discussed below, or herein with respect to other embodiments, such as the coupling members 136 (FIG. 5) between the fixed and floating frames 105, 107.

The second pulley system 190 can include at least one guide pulley, or as depicted in the illustrated embodiment, two guide pulleys 193 between the secondary drum 191 and the floating pulleys 195 to guide the secondary cable 194 and avoid contact between the secondary cable 194 and the first pulley system 108 and/or the fixed or floating frames 105, 107.

The first and second pulley systems 108, 190 are configured to operate in an opposite winding and unwinding relationship. For example, in the illustrated embodiment where the primary drums 123 and secondary drum 191 are mounted on one drive shaft 171, the primary and second cables 128, 194 can be wound about the primary and secondary drums 123, 191, in opposite directions as illustrated in FIG. 2D.

When the cabin 102 is in the upper position, the secondary pulley system 120 can retain the floating frame 107. In one aspect, as the primary drums 123 unwind the cabin 102 is allowed to move toward the lower position while the secondary drum 191 winds the secondary cable 194 and takes up slack in the secondary cable 194 before it is formed. This also facilitates downward movement of the floating frame 107 with respect to the fixed frame 105. The reverse of this sequence can occur as the primary drums 123 wind the primary cables 128 to move the cabin 102 toward the upper position.

The components of the first and second pulley systems 108, 190 can be configured and/or sized to accommodate a desired relative motion between the floating frame 107 and the cabin 102 and/or the fixed frame 105. For example, the length of the primary and secondary cables 128, 194 can be coordinated to control movement and/or speed of the cabin 102 with respect to that of the floating frame 107. In one embodiment, as illustrated in FIG. 2C, the second pulley system 190 can include further cable guiding features, such as a secondary guide pulley 196 and a protective belt 197 extending between and/or around the secondary guide pulley 196 and at least one floating pulley 195. In one aspect, these pulleys 195, 196 can be toothed or geared to engage the protective belt 197 on gears and/or teeth thereof, and the secondary cable 194 can extend adjacent at least a portion of the protective belt 197.

Other suitable embodiments are contemplated. For example, in other embodiments, floating frame 107 may be slidably coupled to the fixed frame 105 via any suitable coupling arrangement, such as two materials configured to slide with respect to each other, linear guides, and/or ball slides at an interface between the fixed and floating rails 104, 106. Instead or in addition to the secondary pulley system 190, in some embodiments the fixed and floating rails 104, 106 can be coupled in such a manner as to exhibit a first resistance sufficient to overcome gravity acting on the floating frame 107 to prevent the floating frame 107 from moving without being biased.

The cabin 102 and/or cabin-coupling frame 101 can be coupled to the floating rails 106 in a similar manner with a second resistance larger than the first resistance such that when the pulley system 108 allows the cabin 102 to be lowered, the second resistance overcomes the first resistance, also moving the floating frame 107. The first and second resistances can be induced via friction, electromagnets of opposed polarity, varying resistance bearings, pulleys and belt combinations, and/or any other suitable manner. In some embodiments, instead of, or in addition to, the second resistance, the cabin 102 and/or cabin-coupling frame 101 can include a first engagement feature configured to be coupled to a second engagement feature on the floating frame 107 to carry the floating frame 107 between the upper and lower positions.

In yet other embodiments, the floating frame 107 can be coupled to the fixed frame 105 via other suitable devices, such as drive motors, ball screws, conveyor apparatuses, or other suitable devices. In still other embodiments the floating frame 107 can be coupled to the fixed frame 105 via geared rack or racks mounted on the fixed frame 105 and a geared pinion or pinions coupled to the floating frame and movably coupled to the geared pinion. In one aspect, a timing belt can be coupled between the cabin 102 and the fixed frame 105 and/or the rack and pinion mechanism to desirably control the movement of the cabin 102 with respect to the floating frame 107 and that of the floating frame 107 with respect to the fixed frame 105.

In one embodiment, as illustrated in FIGS. 2A and 2B, the elevator system 100 includes a control unit 135 operable to manage movement of the cabin 102 and/or operation of the first actuating system 120. In one aspect, the control unit 135 includes electronic circuitry and/or signal communication devices to initiate, actuate, cease, and/or moderate operation of the elevator system 100. The control unit 135 can be mounted to the fixed frame 105 and/or any suitable structure in the fuselage 112.

In some embodiments, the elevator system 100 may include a back-up and/or manually operable mechanism to facilitate operating the system 100 in the event of a power outage. For example, in one embodiment, the elevator system 100 may include a manual operation mechanism 131. In one aspect, the manual operation mechanism 131 includes a control platform 133 and a motion transforming assembly 134 configured to mechanically communicate with at least a portion of the drive mechanism 125. The motion transforming assembly 134 in one aspect can include a plurality of linkages rotatably coupled to each other and/or to one or more transmission devices, to facilitate selective and manual actuation of the drive mechanism 125, for example, when electric power is not available, or the actuating system 120 otherwise ceases to operate.

In one aspect, the control platform 133 includes an adaptor 138 configured to be coupled to a lever or other rotating device or tool (not shown) to rotate therewith and facilitate manual operation of the drive mechanism 125. In some embodiments, the platform 133 can be positioned and/or coupled to a corresponding fuselage deck floor structure, and covered by a removable cover (not shown) that is removably mounted.

Figure 3:
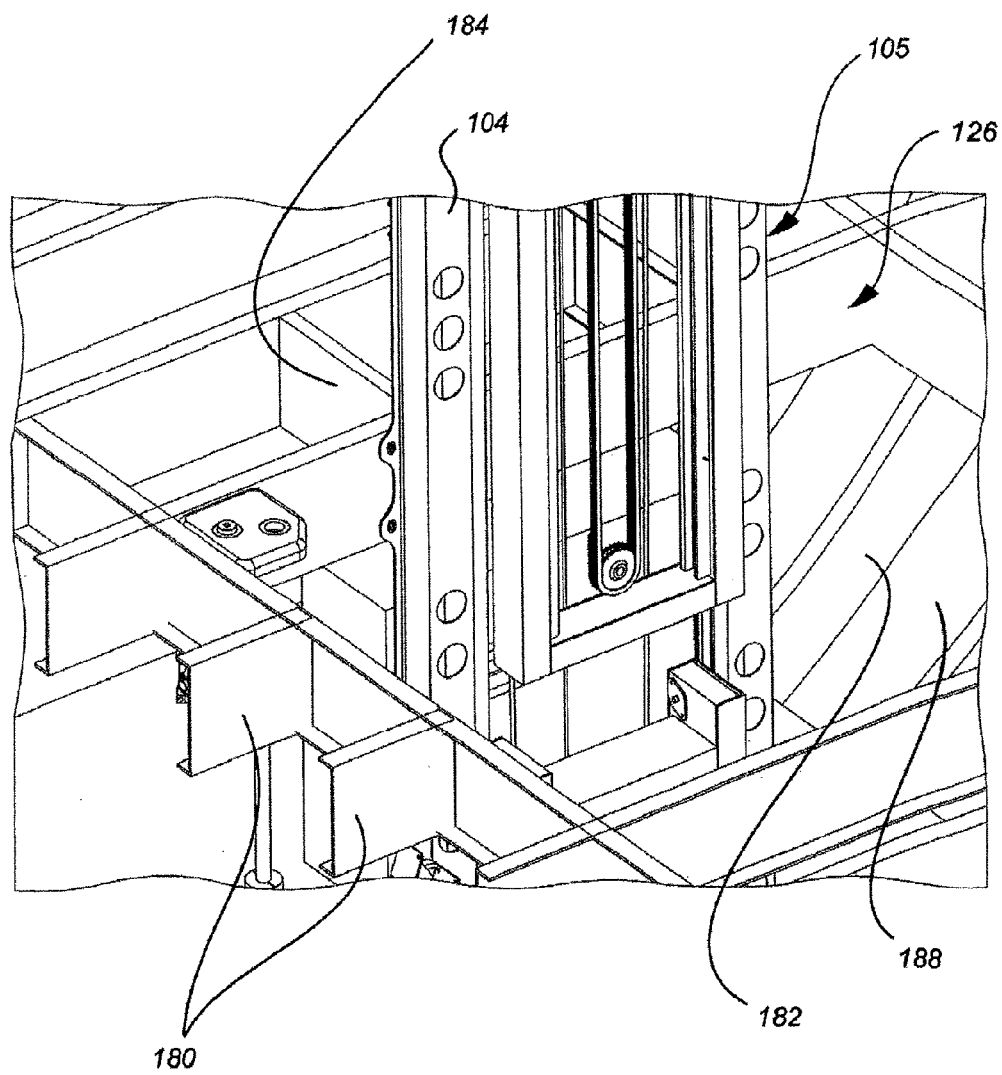
FIG. 3 is an isometric view of portions of the fixed rails of FIG. 2C, according to one embodiment, coupled to the fuselage.

Referring to FIGS. 2A through 3, the fixed frame 105, upper pulley 118, and first actuating system 120 can respectively be directly or indirectly coupled to any suitable structure of the fuselage 112. In one embodiment, the upper pulley 118 can be coupled to an upper deck floor structure 124 of the fuselage 112, and the fixed frame 105 can be coupled to an intermediate floor structure 126 such as floor beams 180. Floor structure as referred to herein can include longitudinal and/or lateral or transverse floor beams, floor panels, seat tracks, floor intercostals, and/or any other structure contributing to the floor structure, or any combination of the foregoing. In some embodiments, the first actuating system 120 can be coupled to any structure of the fuselage 112 and/or to the fixed frame 105.

Referring to FIGS. 2A and 3, in some embodiments, the fixed frame 105 can be coupled or secured to any other suitable structure, such as frames 182, intercostals 184, floor structure including floor beams 180, stringers 186 (FIG. 4), skin 188, and/or any combination thereof, and/or any structure suitable to support the weight and loads imposed by the components of the elevator system 100.

In the illustrated embodiment, the fixed frame 105 is configured to be coupled along an elongated body portion thereof to structure other than the upper deck floor structure 124. The fixed rails 104 can in some aspects be tied or coupled to the upper deck floor structure 124, for example, at opposed fastening portions 121 (FIG. 2C), to improve stabilizing the upper region of the fixed frame 105.

As illustrated in FIG. 2B, in one embodiment, the fixed rails 104 may include two rails connected to each other via at least one connecting or stabilizing member 137 laterally extending therebetween. In some embodiments, the connecting member 137 may include intercostals, frames, trusses, boxes, cross beams, tension or compression bars, and/or any other suitable connecting structure, or any combination thereof.

In some embodiments, the connecting members 137 may include a feature, such as an opening, a recess, or the like, to receive, collect, route, and/or guide the primary cables 128, minimizing or eliminating the need for other cable enclosing or collecting structures. In one embodiment, the floating rails 106 can be respectively slidably coupled to the two fixed rails 104. In some embodiments, the floating rails 106 may be connected to each other via at least one connecting or transverse member similar to the aforementioned connecting member 137 of the fixed rails 104. In some embodiments, the floating frame 107 may include a plurality of members forming a frame.

As shown in the illustrated embodiments of FIGS. 2A and 4, the cabin 102 can be oriented to face in a lateral direction, substantially perpendicular to the longitudinal or roll axis 130, and substantially parallel to the lateral or pitch axis 115, of the fuselage 112. Generally, structure of the fuselage 112, as is typical for aircraft fuselage structure, includes floor structure or floor beams 180 laterally extending along substantially the entire width of the fuselage 112, and spaced at intervals along the longitudinal axis 130. Accordingly, orienting the cabin 102 as stated above facilitates enlarging the depth of the cabin 102 while maintaining its width smaller than the interval distance between floor beams 180 to prevent substantial alteration and reinforcement of floor beams 180.

In one aspect, the cabin 102 includes a door mechanism 139 to facilitate selective access to the cabin 102 and enclosing of an interior of the cabin 102. In one embodiment, the door mechanism 139 includes a mechanism according to an embodiment of the Provisional Application Ser. No. 61/357,903, assigned to the assignee of the present disclosure and incorporated in its entirety herein by reference. In some embodiments, the opening 114 in the fuselage 112 can be sealed with a plug door system configured to be movably coupled to the fuselage 112. In one aspect, the plug door system may include a system according to an embodiment of the aforesaid Provisional Application.

Figure 6:
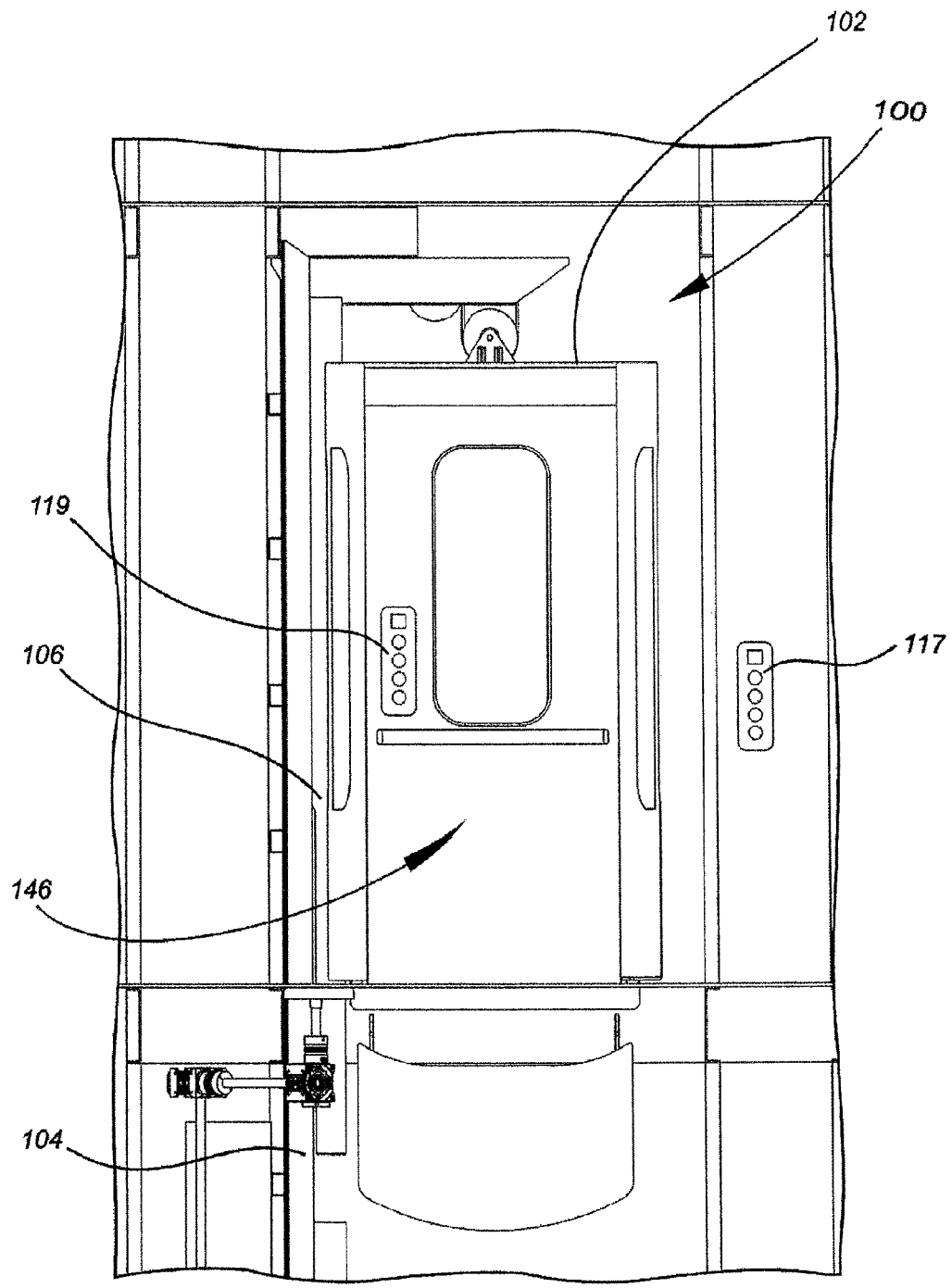
FIG. 6 is a side view of a portion of the elevator system of FIG. 2A, according to one embodiment.

In one aspect, as illustrated in FIG. 6, the elevator system 100 can include a control panel 117 in electronic and/or wireless communication with the control panel 135 and/or drive mechanism 125 (FIG. 2B), and that allows control over actuation and movement of the floating rails 106 with respect to the fixed rails 104, and/or movement of the cabin 102 with respect to the floating rails 106. The control panel 117 can interface with a control program operable to control movement of the cabin 102 and/or to communicate with the control panel 135.

In one embodiment, the cabin 102 can be actuated to move with respect to the floating rails 106 while simultaneously the floating rails 106 move with respect to the fixed rails 104, such that when the floating rails 106 reach their lowermost position, the cabin 102 is at the lower position adjacent or proximate the landing surface 103. Other suitable cabin motion characteristics are possible. Various actuation devices, such as buttons, switches, or the like can be incorporated on the control panel 117 to provide selective control over movement of the cabin 102 and the floating rails 106.

In a multiple deck fuselage, such as the fuselage 112 of the illustrated embodiment, the elevator system 100 can be operable to move the cabin 102 to at least one, or to all, of the decks, and/or to the landing surface 103. The control panel 117 can be configured to communicate with the control panel 135 and/or drive mechanism 125 to cease cabin movement upon arrival at a desired fuselage deck and/or the landing surface 103. One or more control panels 117 can be included in the cockpit of the fuselage 112, and/or any other location in the fuselage 112. For example, in the illustrated embodiment, the control panel 117 is positioned in, and/or is accessible from, the corresponding deck proximate a corresponding opening that aligns with an opening 146 of the cabin 102 that allows loading and unloading.

In some embodiments, a cabin control panel 119 providing selective control over movement of the cabin 102 can also be incorporated with the cabin 102, for example, inside the cabin 102, with provisions to allow authorized personnel and/or cabin occupants to operate the elevator system 100.

As illustrated in FIGS. 2A and 4, in some embodiments, the elevator system 100 can include a ramp mechanism 140. In one embodiment, the ramp mechanism 140 includes a ramp 142. In one aspect, the ramp 142 is pivotably coupled to the cabin 102 to move between a stowed position 141 (FIG. 2B) and a deployed position 143 (FIG. 4).

In the stowed position 141, the ramp 142 can be pivoted such that it is at an angle, such as a substantially right angle, with respect to a plane along which a lower wall, surface, or floor 144 of the cabin 102 generally extends. This configuration consumes less space and requires less modification to the fuselage 112.

In one embodiment, the ramp 142 is pivotably coupled to the cabin 102 toward the floor 144 and the opening 146 of cabin 102. For clarity of description this region is hereinafter referred to as cabin exit region 145 (FIG. 2A).

In one aspect, in the deployed position 143, the ramp 142 extends from the cabin exit region 145 toward and/or to the landing surface 103, to provide a transition between the cabin floor 144 and the landing surface 103, especially for individuals and/or roller carried objects, such as luggage with rollers, wheel chairs, and/or personal roller transports such as Segway® devices. For example, the ramp 142 can form an angled surface that is inclined from the landing surface 103 toward the exit region 145 when the ramp 142 is deployed, the angled surface extending from an upper region 150 of the ramp 142 to a lower region 151 of the ramp 142.

FIG. 7A illustrates one embodiment of the ramp mechanism 140 in more detail. In one aspect, the ramp mechanism 140 includes a deployment device 148 configured to transition the ramp 142 from the stowed position 141 (FIG. 2B) to the deployed position 143 (FIG. 4). The deployment device 148 may include a biasing device and/or a drive system or mechanism, transitioning the ramp 142 from the stowed position 141 toward the deployed position 143, as the cabin 102 emerges from the fuselage 112. The deployment device 148 can be configured to transition the ramp 142 from the deployed position 141 to the stowed position 143 as the cabin 102 elevates from proximate the landing surface 103 toward the opening 114 (FIG. 2A) to enter the fuselage 112. In some embodiments, sensors can be positioned with, or coupled, to the ramp mechanism, cabin, and/or fuselage to monitor the position of the cabin 102 and submit a signal to the deployment device 148 to deploy and/or retract the ramp 142 accordingly.

When the aircraft 110 is parked after landing or prior to take off, the fuselage 112 may shift due to external or internal applied or relieved loads. External sources of load fluctuations can include environmental factors including weather elements, for example, winds and gusts. Internal sources of load fluctuations may include fueling, and/or unloading cargo and passengers. For example, during fueling, the fuselage 112 shifts downward due to fuel weight, and during unloading it shifts upward due to being relieved of cargo and/or passenger weight.

In some embodiments, to prevent the cabin 102 from contacting the landing surface 103 when in the lower position, a lower region or end 169 of the cabin 102 can be spaced from the landing surface 103 by a spacing distance 147. In one embodiment, the spacing distance 147 can range between 2-30 inches, inclusive. In one aspect, the spacing distance 147 can range between 2-15 inches, inclusive, for example, 4 inches. Other distances are contemplated to be within the scope of the present disclosure. This space accounts for movement of the fuselage 112 with respect to the landing surface 103 during loading and/or unloading, and/or due to external loads, such as wind gusts, or internal loads such as weight of fuel when fuel is added after the aircraft 110 lands.

In one embodiment, when the cabin 102 is at the lower position, the elevator system 100 can be configured to detect when the spacing distance 147 reaches a threshold distance suitable for accommodating comfortable loading and/or unloading while providing sufficient space to account for fuselage shifting. When this distance is detected, the elevator system 100 can be configured to submit a signal to the control unit 135 and/or drive mechanism 125 (FIG. 2B) to cease lowering the cabin 102. This desired loading and/or unloading position at which the spacing distance 147 is substantially equal to the threshold distance illustrated in FIG. 7A with respect to one embodiment, and will hereinafter be referred to as a nominal state 155.

In one aspect, the elevator system 100 can include a proximity-sensing device 149 configured to detect the spacing distance 147. The proximity-sensing device 149 can be in electronic and/or wireless communication with the control panel 135 and/or the drive mechanism 125 to cease movement of the cabin 102 when the cabin is lowered toward the lower position and the distance 147 reaches the threshold distance. For example, in one embodiment, the proximity-sensing device 149 may include a sensing device, such as a rotary sensor or other suitable sensor, positioned adjacent or proximate the point or region where the ramp 142 is pivotably coupled to the cabin 102. In some embodiment, the proximity-sensing device 149 can be integrated into the hinge or pivotable connection between the ramp 142 and cabin 102.

The ramp mechanism 140 in one aspect includes a bearing or roller member 152 rotatably coupled toward the lower region 151 of the ramp 142. The roller member 152 can be configured to rotate about at least one, and in one embodiment, two axes of rotation. For example, the roller member 152 can be configured to rotate about a first roller axis 153 parallel to the roll axis 130 (FIG. 2A) of the fuselage 112.

In addition, or instead, in some embodiments, the roller member 152 can be configured to rotate about a second roller axis 154 substantially perpendicular to the pitch and roll axes 115, 130 (FIG. 2A). In one embodiment, the roller member 152 can include a swivel element. The roller member 152 can support the ramp 142 on the landing surface 103, while allowing the ramp 142 to rotate about the first and second roller axes 153, 154, to allow the cabin 102 to shift with the fuselage 112 when the fuselage 112 is subjected to movements, for example along and/or about the pitch or roll axes 115, 130.

Any suitable pivotable connection of the ramp mechanism 140 and the cabin 102 is contemplated to be within the scope of the present disclosure. For example, the ramp mechanism 140 can be pivotably coupled to the cabin 102, the floor 144, and/or proximate the bottom region 169 of the cabin 102, toward the upper end 150 of the ramp 142.

In the illustrated embodiment, the ramp mechanism 140 includes more than one component. For example, in one aspect, the ramp mechanism 140 can include the ramp 142 having a ramp coupling region 158 configured to be pivotably coupled to a lower region of the cabin 102, the cabin exit region 145, and/or to the floor 144 of the cabin 102.

For example, in one aspect, the ramp coupling region 158 can be flexible and/or elastic, or flexible and inelastic, to allow the ramp 142 to pivot without damaging the ramp coupling region 158. In addition, or instead, in some embodiments, the ramp coupling region 158 can be hingedly or otherwise pivotably coupled to the lower region of the cabin 102, the cabin exit region 145, and/or to the floor 144 of the cabin 102.

In the illustrated embodiment, the ramp mechanism 140 includes a support arm 159 pivotably coupled to the lower region of the cabin 102, the cabin exit region 145, and/or to the floor 144 of the cabin 102, toward a first end of the support arm 159. In an aspect, the support arm 159 can be coupled to the ramp 142 toward a second end of the support arm 159. In one aspect, the proximity-sensing device 149 can be positioned in, coupled to, or integrated with the ramp 142 and/or the support arm 159.

In some embodiments, a portion of the cabin 102 toward an upper end thereof can remain within the fuselage 112 when the cabin 102 is in the lower position. Alternatively, the cabin 102 can be entirely outside the fuselage 112, for example entirely below the fuselage 112, when in the lower position.

In one aspect, the proximity-sensing device 149 can be configured to detect movements of the cabin 102 resulting from fuselage movement or other factors. In one aspect, when the proximity-sensing device 149 detects cabin movement based on the spacing distance 147 varying from the threshold distance, the proximity-sensing device 149 can be configured to submit a signal to the drive mechanism 125 and/or control panel 135 (FIG. 2B) to move the cabin 102 in a direction countering the unwanted movement of the cabin 102 to return the cabin 102 to the nominal state 155.

FIG. 7B illustrates a lower region of the cabin 102 and the ramp mechanism 140 in an over-travel state 156, and FIG. 7C illustrates the lower region of the cabin 102 and the ramp mechanism 140 in an under-travel state 157. The over-travel state 156 results when the cabin 102 travels below the nominal state 155, for example due to loading and/or fueling. The under-travel state 157 results when the cabin 102 travels above, or ceases to travel as far as, the nominal state 155. For example, the under-travel state 157 may occur when cargo and/or passengers unload, or the drive mechanism 125 inadvertently ceases lowering the cabin 102 before the cabin 102 reaches the nominal state 155.

In some embodiments, the proximity-sensing device 149 is configured to detect over-travel (i.e., less than spacing distance 147) beyond a first threshold variation, for example an inch or more, and detect under-travel (i.e., spacing distance >47) beyond a second threshold variation, for example an inch or more. Upon detecting under-travel and/or over-travel beyond the first and second threshold variations, respectively, the sensing device 149 can submit a signal to the control unit 135 and/or the drive mechanism 125 to move the cabin 102 to correct the under-travel and/or over-travel, and return the cabin 102 toward and/or to the nominal state 155. The drive mechanism 125 and/or the control panel 135 can be in electronic or wireless communication with the proximity-sensing device 149, for example, via electronic and/or wireless circuitry.

In one embodiment, the drive mechanism 125 can be configured to correct the state of the cabin 102 at a slow and/or subtle rate. For example, without limitation, this rate can include about one inch per minute, or any other suitable rate that facilitates reducing the impact or cognizance of such movement as perceived by individuals positioned on the ramp 142 or in the cabin 102 at the time that the state of the cabin 102 is being corrected. In some embodiments, the proximity-sensing device 149 can be in electronic and/or wireless communication with the deployment device 148 to timely deploy and/or retract the ramp 142 as discussed above.

As illustrated in FIGS. 2B and 2C, in some embodiments, the elevator system 100 includes a support apparatus 111 is configured to support the cabin 102 via the upper pulleys 118 and primary cables 128. In one aspect, the support apparatus 111 configured to inhibit, limit, and/or maintain at a desired level, or in some embodiments substantially eliminate, a load transfer relationship between the elevator system 100 and the upper deck floor structure 124 (FIGS. 2A and 4).

The first actuating system 120, in one aspect, is configured to cease winding and/or unwinding the primary cable 128 in the event of a sudden gain and/or drop of the cabin 102, or when an actual acceleration, deceleration, or velocity of the cabin 102 is detected to be beyond a threshold acceleration, deceleration, or velocity. In some embodiments, sensors can be incorporated to detect sudden behavior of the cabin 102 and communicate the same to the control unit 135. In some embodiments, such a sensing system can be incorporated with, or be coupled to, the support apparatus 111 as described below.

FIGS. 8A, 8B, and 8C illustrate one embodiment of the support apparatus 111 in more detail.

As illustrated in FIG. 8A, in one aspect, the support apparatus 111 includes a first portion or beam assembly 160 that is configured to support the cabin 102. The beam assembly 160 is coupled to a second portion or load limiting assembly 162 that in one embodiment includes a biasing device 161 configured to moderate the load transferred between the elevator system 100 and the upper deck floor structure 124 (FIG. 2A).

In one embodiment, as more clearly illustrated in FIG. 8B, the beam assembly 160 and the biasing device 161 are operatively coupled to each other by the load limiting assembly 162. In one aspect, the load limiting assembly 162 can be coupled to the upper deck floor structure 124 (FIG. 2A) and include a lever 163 configured to rotate about a lever axis 165. In one embodiment, the beam assembly 160 is configured to engage the lever 163 on one side of the lever axis 165, and the biasing device 161 is configured to engage the lever 163 on a second side of the lever axis 165, for example, a second side that is opposed to the first side.

In one embodiment, the beam assembly 160 is movably coupled to the load limiting assembly 162. For clarity of illustration and description, the following discussion regarding one embodiment of the upper support assembly 111 is directed to an aspect of the beam assembly 160 having two beam members 164, and an aspect of the load limiting assembly 162 having two support fittings 166, as illustrated in FIGS. 8A through 8C.

Furthermore, for clarity of description, the discussion that follows with respect to one embodiment is directed to the relationship between one of the beam members 164 and one of the support fittings 166. The other beam member 164 and support fitting 166 can be configured, and can operate, in substantially the same manner.

However, it is contemplated that other embodiments may utilize other suitable beam and/or load limiting or balancing assemblies movably coupled to one another to reduce the load transferred to the upper deck floor structure 124. Embodiments of the present disclosure and the claims that follow are not limited to the described embodiments.

In one embodiment, the first end of each primary cable 128 can be fixedly connected to the support apparatus 111. In one embodiment, the upper pulley 118 and/or the guide pulleys 132 are rotatably coupled to the beam member 164, and the first end of the primary cable 128 is fixedly attached to the beam member 164. The support apparatus 111 can include a rigging fitting 174 coupled to a corresponding primary cable 128, and configured to rig the primary cable 128. The rigging fittings 174 can be adapted to allow a user to rig the primary cable 128 for sufficient tension and/or alignment with adjacent cables, such as the adjacent dual redundant primary cables 128 of the illustrated embodiment. In the illustrated embodiment, the cabin pulley 116 is positioned between the first end of the primary cable 128 and the upper pulley 118, facilitating efficient and smooth operation of the cabin 102 between the upper and lower positions.

During operation of the elevator system 100, the upper beam assembly 160 can support the weight of, and/or a cabin force exerted by, the cabin 102. The cabin 102 may exert the cabin force based on gravity acting on the cabin 102 and motion characteristics of the cabin 102, such as its velocity, acceleration, and/or deceleration. When subjected to the cabin force, the upper beam assembly 160 in one aspect engages the lever 163 on the first side thereof and transfers the cabin force to the lever 163. In one aspect, the lever 163 is urged to rotate about the lever axis 165, and transfers the cabin force to the biasing device 161.

In one aspect, the biasing device 161 is configured to detect the cabin force and communicate with the control panel 135 and/or drive mechanism 125 (FIG. 2B) to cease the drive mechanism 125 when the cabin force is equal to or greater than a threshold force. For example, as illustrated in FIG. 8C, the biasing device 161 can include a biasing member 167 in electronic and/or wireless communication with the control unit 135 and/or the drive mechanism 125.

In one embodiment, the beam member 164 is pivotably coupled with respect to the fuselage 112 and/or the fixed frame 105. In the illustrated embodiment, the beam assembly 160 can be pivotably coupled to at least one mounting structure of the fixed frame 105, such as a support bracket 183, an axial intercostal 185, the fixed rails 104 and/or the lateral intercostals 137. In one aspect, as illustrated in FIGS. 8B and 8C, the beam 164 may include a first coupling feature 168. The first coupling feature 168 can in one embodiment include a protrusion, a tab, other protuberance, or any other suitable extension.

In one aspect, the support fitting 166 includes a second coupling feature 170, the first coupling feature 168 being configured to be slidably coupled or engaged to, or movably positioned in, the second coupling feature 170. The second coupling feature 170 can include a recess, an opening, a slot, or any other suitable feature configured to be slidably coupled to the first coupling feature 168, or large enough to allow the first coupling feature move therein. In one aspect, the lever 163 is rotatably coupled to the support fitting 166, as in the illustrated embodiments. In other embodiments the lever 163 may be directly or via a stanchion or spacing member be coupled to the upper deck floor structure 124.

In the illustrated embodiment, the first coupling feature 168 of the beam member 164 is configured to slide or move downward as the cabin force is applied to the beam member 164 and the beam member 164 is pivoted with respect to the fixed frame 105. As it slides downward, the first coupling feature 168 bears against or engages the lever 163 toward the first end of the lever 163. The lever 163 then tends to raise toward the second end, opposite to the first end.

The second end of the lever 163 is configured to transfer the cabin force to the biasing member 167 to limit, and/or otherwise moderate the load transferred to the upper deck floor structure 124. The biasing member 167 may include a spring or other pressure device or mechanism, such as a hydraulic or pneumatic system, or other suitable biasing member or feature.

In some embodiments, the biasing force and/or resistance capacity of the biasing member 167 can be sufficient to react to, or counter, the cabin force up to the threshold force, beyond which the biasing member 167 yields. For example, in an embodiment where the biasing member 167 is a spring, the spring can include a spring constant that prevents the spring from contracting when subject to a cabin force up to the threshold force. If the cabin force exceeds this threshold force and the spring contracts, the contraction can be detected by a sensing device and signal submitted to the control panel 135 and/or drive mechanism 125 to cease operation of the elevator system 100.

In such an embodiment, the lever 163 is static until the system undergoes an overload condition and the biasing member 167 yields, therefore, the sensing device can also be configured to detect a movement of the lever 163, and/or in some embodiments be mounted on the lever 123. Therefore, the upper floor deck structure 124 (FIG. 2A) can be prevented from experiencing overloading or loading beyond the threshold force.

It is contemplated that in other embodiments, instead of, or in addition to the biasing device 161, a sensing member or device, such as strain gages, load cell pins, load cells, or other stress, strain, or load measuring devices can be utilized to measure the load exerted on the upper beam 164 and/or the upper deck floor structure 124, the measuring device being configured to submit a signal to the control unit 135 and/or drive mechanism 125, to limit the load induced by, or cease operation of, the cabin 102.

In some embodiments, the first coupling features 168 of the beam assembly 160 can include a load cell pin coupled to the beam members 164 and extending in the second coupling feature 170, for clarity of description hereinafter referred to as slot 170. The load cell pin can be configured to detect a magnitude of the cabin force based on associated stresses and/or bending loads it experiences. In one aspect, the load cell pin can be in electronic and/or wireless communication with the actuating system 120 and/or drive mechanism 125 via electronic circuitry and/or a signal emitting device communicating with the control unit 135, to cease operation of the drive mechanism 125 when a load beyond a threshold load is detected.

As illustrated in FIG. 9, in some embodiments, when the cabin 102 is in a stowed position, for example in the upper position, a securing mechanism 172 can be used to anchor the cabin 102 to a structure of the fuselage 112 and/or the fixed frame 105 to retain the cabin 102 substantially immobile, for example, during flight.

In one embodiment, the securing mechanism 172 can include an extension arm 176 rotatably coupled to a portion of the fixed frame 105, and a hook element 178 fixedly or rotatably coupled to the extension arm 176. The securing mechanism 172 in one aspect can include a retaining structure 179 configured to be removably coupled or engaged to the hook element 178. The retaining structure 179 can in one embodiment be coupled to a structure or coupling feature of the cabin 102. When the hook element 178 and the retaining structure 179 are engaged, the cabin 102 is substantially anchored in the stowed position, substantially relieving the first pulley system 108 and the support assembly 111.

In such embodiments, the first actuating system 120 can be selectively manually or automatically operated to slightly rotate the cabin pulley 116, for example, a 90 degree rotation, to reduce the tension in the primary cable 128 and substantially prevent cabin force or load exerted by the weight of the cabin 102, from being transferred to the upper deck floor structure 124. In one aspect, when the retaining structure 179 is coupled to the cabin 102, the first coupling feature 168 can relieve the lever 163 and/or float in the second coupling feature or slot 170.

Therefore, during flight, shifting of the upper deck floor structure 124 does not significantly impact the cabin 102, and the cabin force does not significantly load the upper deck floor structure 124.

The securing mechanism 172 can be selectively manually or automatically operated. For example, the securing mechanism 172 can be in electronic and/or wireless communication with a securing mechanism control panel (not shown) that can be positioned at any of the aircraft decks, the cockpit, in the cabin 102, or any other suitable location. In some embodiments, the securing mechanism control panel can be in electronic and/or wireless communication with the control panel 135 (FIG. 2B), which in turn can be configured to control actuation of the securing mechanism 172 between a disengaged state in which the cabin 102 is free to move, and an engaged state in which the securing mechanism 172 retains the cabin 102 in the stowed position.

Embodiments including the support apparatus 111 substantially prevent the upper deck floor structure 124 from being overloaded, and guard against sudden cabin movement.

Furthermore, in some embodiments as discussed above, load transfer to the upper deck floor structure 124 is moderated or eliminated, for example via the biasing member 161 and/or the securing mechanism 172. In such embodiments, fuselage deflections and movements are not adversely impacted by, and do not adversely impact, the elevator system 100.

In some embodiments, the beam member 164 may include a protective cover or outer member 181, illustrated in FIG. 8A and removed in FIG. 8B for clarity of description and illustration. The protective cover 181 can be a structural member in some embodiments.

FIG. 10 illustrates an aircraft elevator system 200 including a cabin 202 according to another embodiment. The system 200 is configured to be installed in a fuselage to facilitate movement of the cabin 202 between upper and lower positions, similar to the upper and lower positions discussed above.

In one embodiment, the system 200 includes a primary or fixed frame 204 and a secondary or translating frame 206 configured to be movably coupled to the fixed frame 204 by a first or primary ball screw mechanism 207. The system 200, in one embodiment, further includes a cabin-coupling frame 208 configured to movably couple the cabin 202 to the translating frame 206 via a secondary ball screw mechanism 209.

As illustrated in FIG. 11A, the fixed frame 204, in one aspect, can include laterally opposing longitudinal rails 210 and longitudinally opposing transverse elements 211. The upper transverse element 211 is removed in FIG. 10 for clarity of illustration.

Referring to FIGS. 11A and 11B, the primary ball screw mechanism 207 can include a first or primary screw member 214, in one aspect extending parallel to, and positioned between, the longitudinal rails 210, and a first or primary ball nut 217 rotatably coupled to the translating frame 206 and configured to movably engage the primary screw member 214. In one embodiment, the first ball nut 217 is movably coupled to the first screw member 214 via a plurality of balls configured to travel in threads of the first screw member 214. Other suitable ball screw couplings are possible. The first ball nut 217 is configured to rotate with respect to the first screw member 214 to move the translating frame 206. In one aspect, the primary ball screw mechanism 207 includes at least one, or as illustrated, a first pair of drive motors 216 for driving the first ball nut 217.

FIG. 11B illustrates the translating frame 206 according to one embodiment, and FIG. 11C illustrates a cabin-coupling frame 208 according to one embodiment. In one aspect, the secondary ball screw mechanism 209 includes a second or secondary screw member 218, at least one, or as illustrated, a second pair of drive motors 222, and a second or secondary ball nut 224 configured to be movably coupled to the secondary screw member 218. The second ball nut 224 is configured to be movably coupled to the second screw member 218 via a plurality of balls. In one aspect, the drive motors 222 can be selectively and/or automatically operated to rotate the second ball nut 224 with respect to the second screw member 218, for example via the balls of the second ball nut 224 traveling in threads of the second screw member 218, to move the cabin-coupling frame 208 and the cabin 202.

In one aspect, as illustrated in FIG. 10, the cabin-coupling frame 208 is fixedly attached to the cabin 202 to move the cabin 202 therewith. Motion characteristics of the cabin 202 can be controlled similar that of the previously described embodiment between the upper and lower positions.

In one embodiment, as illustrated in FIGS. 10, 11A, and 11B, the translating frame 206 includes at least one sliding coupling member 226 configured to be slidably coupled to the translating frame 206 to the longitudinal rails 210 of the fixed frame 204. For example, the sliding coupling member 226 can include ball guides configured to be slidingly received, or coupled to, inwardly facing guides 230 of the longitudinal rails 210.

In one embodiment, the translating frame 206 can include opposing guide rails 220. Referring to FIGS. 11B and 11C, the cabin-coupling frame 208 can include at least one sliding coupling member 228 slidingly coupled to the guide rails 220 of the translating frame 206.

In one aspect, the longitudinal rails 210 of the fixed frame 204 and the guide rails 220 of the translating frame 206 respectively guide the cabin-coupling frame 208 and cabin 202, and resist any tendency of the cabin to rotate about the longitudinal axis of the fuselage. This is particularly advantageous when the cabin 202 is outside the fuselage and also when the cabin 202 is stowed during flight.

In some embodiments, the second ball nut can be incorporated or integrated with the cabin 202. In some embodiments, the cabin 202 having an integrated ball nut, or being coupled to the cabin-coupling frame 208 which in turn includes the second ball nut 224, can be movably coupled to the first screw member 214, eliminating the need for a translating frame.

Embodiments utilizing a ball screw mechanism to move the cabin eliminate the need for motion structure or mechanism within the shaft through which the cabin moves, and eliminate the need for cables and complexities associated with three-dimensional chassis that are positioned on top of an elevator cabin. In addition, the range of motion of the cabin is enhanced, because the uppermost position of the elevator is not limited by any structure that is positioned on top of the cabin. This configuration further minimizes the quantity of components, thereby reducing parts, labor, maintenance, structural modifications to existing fuselage structure and inspection requirements of the system. In addition, the ball screw mechanism provides for a smooth ride of the cabin.

FIG. 12A illustrates an aircraft elevator system 300 according to yet another embodiment. The system 300 includes a cabin 302 and a pressure-driven lift system 301, such as a hydraulically or pneumatically driven lift system. The system 300 is configured to be installed in a fuselage 312, to facilitate movement of the cabin 302 within and outside the fuselage 312, for example between upper and lower positions similar to the upper and lower positions described further above.

In one embodiment, the system 300 includes primary or fixed rails 304 and a secondary or translating frame 306 movably coupled or mounted with respect to the fixed rails 304. The fixed rails 304 can be formed, coupled to, or constituted by laterally opposing members 314 of a fixed frame 305. The translating frame 306 can include laterally opposing members 316 that can slide with respect to, or be slidably coupled to, the fixed rails 304 in any suitable manner, including those discussed herein with respect to other embodiments.

In one aspect, the system 300 includes a cabin-coupling frame 308, coupling the cabin 302 to the translating frame 306. In one embodiment, the cabin-coupling frame 308 is movably coupled to the translating frame 306, for example, slidably coupled thereto, in any suitable manner, for example via linear guides or any other manner as discussed herein with respect to other embodiments.

In one aspect, the translating frame 306 can be moved with respect to the fixed rails 304 by the pressure-driven lift system 301. In one embodiment, the pressure-driven lift system 301 includes at least one pressure actuator 303, which can include a telescoping ram, or other suitable actuator. The pressure actuator 303 is configured to be fixedly coupled to a fuselage structure or to a portion of the fixed frame 305 at a first end of the actuator, and to the translating frame 306 toward a second end of the actuator 303, opposed to the first end.

For example, the second end of the actuator 303 can be coupled to a transverse member or intercostal 307 of the translating frame 306. The pressure actuator 303 expands in response to applied pressure, such as hydraulic and/or pneumatic pressure to move the cabin 302 and translating frame 306 toward the upper position. In one aspect, the pressure actuator 303 is configured to retract in response to relieving the pressure to move the translating frame 306 and the cabin 302 toward the lower position.

In one aspect, the second end of the actuator 303 can be rotatably coupled to the translating frame 306, for example to the transverse member 307, about an axis substantially parallel to a lateral axis 313. In such an embodiment, any potential fore and aft movement or rotation of the cabin 302 or translating frame 306 about the lateral axis 313 does not transfer to the actuator 303. Moreover, the fixed rails 304 can provide lateral and fore and aft support for the translating frame 306 and cabin 302.

In one embodiment, the system 300 includes one or more pulleys 309 mounted to the translating frame 306. Each pulley 309 guides a cable, chain, or belt 311. One end of each cable 311 is attached to a fuselage structure or to a portion of the fixed frame 304, such as a lower end region thereof, and the other end is attached to the cabin-coupling frame 308. As the pressure actuator 303 moves the translating frame 306 along the fixed rails 304, for example in the up and down directions, cables 311 cause the cabin-coupling frame 308 to move with respect to, the translating frame 306.

Accordingly, in one aspect, as the cabin 302 and cabin-coupling frame 308 ascend or descend, they can move with respect to both the fixed rails 304 and the translating frame 306. The cables 311 can be dimensioned to allow the cabin 302 descend to the lower position, for example toward a landing surface, when the pressure actuator 303 is fully retracted and the translating frame 306 is in its lowermost position. The cabin 302 can move a larger distance than the translating frame 306 for a given movement of the pressure actuator 303. In one embodiment, the cabin 302 moves two inches for every inch of movement of the pressure actuator 303.

FIG. 12B illustrates the coupling of the cabin 302, cabin-coupling frame 308, translating frame 306, and fixed rails 304, according to one embodiment. In one embodiment, intercostals or laterally extending members of the translating frame 306, such as the laterally extending member 307, can include a cable protective feature 317, such as a recess, opening, or other suitable feature through which the cables 311 pass.

FIG. 13A illustrates an aircraft elevator system 400 according to still another embodiment. The system 400 includes a conveyor-driven lift system 401 and a cabin 402. The system 400 is configured to be installed in a fuselage 412, to facilitate movement of the cabin 402 between upper and lower positions similar to the upper and lower positions described further above.

In one embodiment, the system 400 includes primary or fixed rails 404 and a secondary or translating frame 406 movably coupled or mounted with respect to the fixed rails 404. The fixed rails 404 can be formed, coupled to, or constituted by laterally opposing members 414 of a fixed frame 405. The translating frame 406 can include laterally opposing members 416 that can slide with respect to, or be slidably coupled to, the fixed rails 404 in any suitable manner, including those discussed herein with respect to other embodiments.

In one embodiment, the translating frame 406 is moved with respect to the fixed rails 404 via at least one primary drive system 418 configured to actuate or drive at least one primary conveyor, or as shown in the illustrated embodiment, two primary conveyors 403. Incorporation of more primary conveyors is possible.

In one embodiment, the primary drive system 418 includes one or more primary drive pulleys 409 mounted to the fixed frame 404, for example toward an upper end thereof, and one or more primary idler pulleys 411 mounted to the fixed frame 405 or to a fuselage structure, for example toward a lower end of the fixed frame 405. The primary drive and idler pulleys 409, 411 respectively drive and guide the primary conveyors 403.

In one aspect, the primary drive system 418 can include at least one primary drive motor 413 operatively coupled to at least one primary gearbox or transmission 415. In one aspect, gearbox or transmission 415 is operatively or drivingly coupled to the drive pulleys 409.

In one aspect, as illustrated in FIG. 13B, the primary conveyors 403 are coupled to the translating frame 406 via coupling members 417. The translating frame 406 may include respective guiding members 419 through which the primary conveyors 403 pass. The guiding member 419 can be positioned opposite the coupling members 417. In one embodiment, the coupling members 417 can extend axially to be coupled to a larger area of the corresponding primary conveyor 403 for added stability.

As illustrated in FIG. 13C, in one aspect the system 400 includes a cabin-coupling frame 408 coupling the cabin 402 to the translating frame 406. In one embodiment, the cabin-coupling frame 408 is movably coupled to the translating frame 406. In one aspect, the cabin-coupling frame 408 is movably coupled with respect to the translating frame 406 via at least one secondary drive system 420 configured to actuate or drive at least one secondary conveyor, or as shown in the illustrated embodiment, two secondary conveyors 407, also visible in FIG. 13A. Incorporation of more secondary conveyors is possible.

In one embodiment, as illustrated in FIG. 13C, the secondary drive system 420 includes one or more secondary drive pulleys 421 mounted to the translating frame 406, for example toward an upper end of the translating frame 406. In one aspect, the secondary drive system 420 also includes one or more secondary idler pulleys 423 mounted to the translating frame 406 or a fuselage structure, for example toward a lower end of the translating frame 406. The secondary drive and idler pulleys 421, 423 respectively drive and guide the secondary conveyors 403. The secondary drive system can include at least one secondary drive motor 425 operatively coupled to at least one secondary gearbox or transmission 427. In one aspect, the secondary gearbox or transmission 427 is operatively or drivingly coupled to the secondary drive pulleys 421.

In one aspect, as illustrated in FIG. 13B, the secondary conveyors 407 are coupled to the cabin-coupling frame 408 via coupling members 429. The cabin-coupling frame 408 may include at least one guiding member 431 through which the secondary conveyors 407 pass. The guiding member 431 can be positioned opposite the coupling members 429. In one embodiment, coupling members 429 can extend axially to be coupled to a larger area of the corresponding secondary conveyor for added stability.

The primary and/or secondary conveyors 403, 407 can include one or more belts, chains, straps, or other suitable conveyor members.

Certain embodiments are described herein to provide a thorough understanding of some embodiments of the present disclosure. Other embodiments are contemplated to be within the scope of the present disclosure. For example, in some embodiments, fixed and floating frames and/or a cabin and a floating frame can be electromagnetically movable with respect to one another, for example via respective railings provided with opposing polarity electromagnetic members and/or electrically activated or alternating polarity electromagnetic members. In yet other embodiments, fixed and floating frames and/or a cabin and a floating frame can be movably coupled via a rack and pinion mechanisms for example, a rotating member with gears and threads threadedly moving with respect to a rail with complementing gears and or threads. Other suitable embodiments are possible.

As demonstrated herein, embodiments of the present disclosure provide a lightweight and efficiently operated elevator system for aircraft that facilitates transporting individuals and/or objects inside and outside aircraft fuselage while being configured to be stowed in the aircraft. An elevator system according an embodiment of the present disclosure, allows operators or owners immense flexibility in landing locations because it allows loading and unloading to be independent of external devices, such as jet ways, external lift and/or escalator systems, and stairs.

The various embodiments described above can be combined to provide further embodiments. For example, fixed and floating frames can be movably coupled via a ball screw mechanisms while a cabin is moved via a pulley system. Other systems may combine a pressure driven system with a ball screw driven system. Other combinations are possible and contemplated to be within the scope of the present disclosure.

All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An aircraft elevator system comprising:
a cabin;
a primary frame;
a secondary frame having upper and lower ends;
a first coupling system arranged to moveably couple the primary frame to the secondary frame, the first coupling system configured to move the secondary frame relative to the primary frame; and
a second coupling system arranged to moveably couple the cabin to the secondary frame, the second coupling system configured to move the cabin relative to the secondary frame between upper and lower positions and operable simultaneously with the first coupling system such that in the upper position the cabin is situated toward the upper end of the secondary frame and in the lower position the cabin is situated toward or below the lower end of the secondary frame.

2. The aircraft elevator system of claim 1, further comprising:
an actuating mechanism operatively coupled to the first and second coupling systems, the actuating mechanism configured to drive the first and second coupling systems to move the secondary frame relative to the primary frame and simultaneously move the cabin relative to the secondary frame between upper and lower positions.

3. The aircraft elevator system of claim 1 wherein the cabin includes a lower end configured to be positioned at a spacing distance from a landing surface when the cabin is in the lower position and further comprises:
a ramp positioned toward the lower end and including a surface extending from adjacent the lower end to adjacent the landing surface, the ramp being pivotably or rotatably coupled to the cabin toward the lower end of the cabin and configured to pivot or rotate about a rotation axis, and to compensate for cabin movement when the cabin is in the lower position.

4. The aircraft elevator system of claim 3, further comprising:
at least one sensing device configured to detect a magnitude of cabin movement shifting the cabin from a desired position to an offset position; and
an actuating system configured to move the cabin, the actuating system configured to be in at least one of electronic and wireless communication with the at least one sensing device, the at least one sensing device configured to submit a signal to the actuating system upon detection of the cabin movement, the actuating system configured to move the cabin in response to the signal to correct the cabin movement and return the cabin toward the desired position.

5. The aircraft elevator system of claim 3, further comprising:
at least one sensing device configured to detect a magnitude of the spacing distance; and
an actuating system configured to move the cabin, the actuating system configured to be in at least one of electronic and wireless communication with the at least one sensing device, the at least one sensing device configured to submit a signal to the actuating system upon detection of a threshold magnitude for the spacing distance, to cease movement of the cabin.

6. An aircraft elevator system comprising:
a cabin;
a primary frame;
a secondary frame having upper and lower ends;
first coupling means for movably coupling the primary frame to the secondary frame; and
second coupling means for movably coupling the cabin to the secondary frame, the cabin configured to move between upper and lower positions, the first and second coupling means operating simultaneously to moderate respective movements of the secondary frame with respect to the primary frame and the cabin with respect to the secondary frame such that in the upper position the cabin is situated toward the upper end of the secondary frame, and in the lower position the cabin is situated toward or below the lower end of the secondary frame.

7. An aircraft elevator system configured to be mounted to an aircraft fuselage structure, the aircraft elevator system comprising:
at least one fixed rail;
at least one floating rail movably coupled to the at least one fixed rail, the at least one floating rail configured to move relative to the at least one fixed rail in a vertical direction between a floating rail upper position and a floating rail lower position;

a cabin movably coupled to the at least one floating rail, the cabin configured to move relative to the at least one floating rail in the vertical direction between a cabin upper position and a cabin lower position;

a pulley system operable to move the at least one floating rail relative to the at least one fixed rail between the floating rail upper position and the floating rail lower position and move the cabin relative to the at least one floating rail between the cabin upper position and the cabin lower position, the pulley system comprising:

at least one upper pulley coupled to the aircraft fuselage structure proximal to an upper end of the at least one fixed rail, the at least one upper pulley fixedly located relative to the upper end of the at least one fixed rail; and at least one floating pulley rotatably coupled to the at least one floating rail, the at least one floating pulley configured to move with the at least one floating rail, the at least one upper pulley and the at least one floating pulley cooperating to move the cabin relative to the at least one floating rail between the cabin upper position and the cabin lower position and the at least one floating rail relative to the at least one fixed rail between the floating rail upper position and the floating rail lower position.

8. The aircraft elevator system of claim 7 wherein the pulley system includes at least one cable and at least one guide pulley, the at least one guide pulley arranged to guide the at least one cable toward an actuation system.

\* \* \* \* \*